US012792988B2

(12) United States Patent
Tsujibe et al.

(10) Patent No.: US 12,792,988 B2
(45) Date of Patent: Nov. 10, 2026

(54) RETRIEVAL METHOD AND RETRIEVAL DEVICE

(71) Applicant: Hitachi, Ltd., Tokyo (JP)

(72) Inventors: Akihisa Tsujibe, Tokyo (JP); Tazu Nomoto, Tokyo (JP); Kenji Oya, Tokyo (JP); Teppei Inoue, Tokyo (JP); Keiichi Bamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/761,094

(22) Filed: Jul. 1, 2024

(65) Prior Publication Data

US 2025/0021902 A1 Jan. 16, 2025

(30) Foreign Application Priority Data

Jul. 10, 2023 (JP) ................................ 2023-113180

(51) Int. Cl.
*G06Q 10/06* (2023.01)
*G06Q 10/0631* (2023.01)

(52) U.S. Cl.
CPC .............................. *G06Q 10/06315* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 2013/0091217 | A1* | 4/2013 | Schneider | G06Q 10/40 709/204 |
| 2013/0268525 | A1* | 10/2013 | Kanai | G06Q 30/02 707/723 |
| 2016/0180028 | A1* | 6/2016 | Hayakawa | G16H 10/60 705/3 |
| 2016/0253710 | A1* | 9/2016 | Publicover | G06Q 30/0269 705/14.66 |
| 2019/0236675 | A1 | 8/2019 | Ishiguro | |
| 2020/0402122 | A1 | 12/2020 | Kim et al. | |
| 2022/0335507 | A1* | 10/2022 | Cracco | G06Q 30/0641 |

FOREIGN PATENT DOCUMENTS

| | | | | |
|---|---|---|---|---|
| EP | 1973047 | A1 * | 9/2008 | G06F 16/9027 |
| JP | 2019-212016 | A | 12/2019 | |
| WO | 2017/212667 | A1 | 12/2017 | |

* cited by examiner

*Primary Examiner* — Kurtis Gills
(74) *Attorney, Agent, or Firm* — MATTINGLY & MALUR, PC

(57) ABSTRACT

In a retrieval method executed by a retrieval device in which a storage unit holds enterprise information, classification code information, and item keyword information corresponding to an enterprise and an item of a particle supplied by the enterprise, at least one of a keyword indicative of a business of a first enterprise or a classification code of an item registered by the first enterprise is input. At least one item keyword is extracted corresponding to at least one of an enterprise similar to the first enterprise or an item similar to the item registered by the first enterprise, based on at least one of the keyword indicating the business of the first enterprise or the classification code of the item registered by the first enterprise, by referring to the enterprise information, the classification code information, and the item keyword information. Then, the extracted at least one item keyword is output.

7 Claims, 17 Drawing Sheets

FIG. 2

ENTERPRISE INFORMATION 120

120a 120b 120c

| ENTERPRISE NAME | CATEGORY | BUSINESS KEYWORD |
|---|---|---|
| COMPANY C | SUPPLIER | AUTOMOBILE |
| COMPANY C | SUPPLIER | PARTS |
| COMPANY D | SUPPLIER | PARTS |
| COMPANY E | SUPPLIER | ELEVATOR |
| COMPANY F | SUPPLIER | CONSTRUCTION EQUIPMENT |
| ... | ... | ... |
| COMPANY M | BUYER | AUTOMOBILE |
| COMPANY M | BUYER | COMPLETED PRODUCT |
| ... | ... | ... |
| COMPANY A | SUPPLIER | AUTOMOBILE |
| COMPANY A | SUPPLIER | PARTS |

FIG. 3

SECRET INFORMATION 121

121a 121b 121c

| ENTERPRISE NAME | PARTICULARS | DISCLOSURE/ NON-DISCLOSURE |
|---|---|---|
| COMPANY C | TRANSACTION PERFORMANCE_ENTERPRISE NAME | DISCLOSURE |
| COMPANY C | TRANSACTION PERFORMANCE_START DATE | DISCLOSURE |
| COMPANY C | TRANSACTION PERFORMANCE_END DATE | DISCLOSURE |
| COMPANY C | TRANSACTION PERFORMANCE_TRANSACTION NUMBER | DISCLOSURE |
| ... | ... | ... |
| COMPANY M | TRANSACTION PERFORMANCE_ENTERPRISE NAME | DISCLOSURE |
| COMPANY M | TRANSACTION PERFORMANCE_START DATE | DISCLOSURE |
| COMPANY M | TRANSACTION PERFORMANCE_END DATE | DISCLOSURE |
| COMPANY M | TRANSACTION PERFORMANCE_TRANSACTION NUMBER | DISCLOSURE |
| COMPANY N | TRANSACTION PERFORMANCE_ENTERPRISE NAME | NON-DISCLOSURE |
| COMPANY N | TRANSACTION PERFORMANCE_START DATE | DISCLOSURE |
| COMPANY N | TRANSACTION PERFORMANCE_END DATE | DISCLOSURE |
| COMPANY N | TRANSACTION PERFORMANCE_TRANSACTION NUMBER | NON-DISCLOSURE |
| COMPANY P | TRANSACTION PERFORMANCE_ENTERPRISE NAME | DISCLOSURE |
| COMPANY P | TRANSACTION PERFORMANCE_START DATE | DISCLOSURE |
| COMPANY P | TRANSACTION PERFORMANCE_END DATE | DISCLOSURE |
| COMPANY P | TRANSACTION PERFORMANCE_TRANSACTION NUMBER | DISCLOSURE |
| COMPANY X | TRANSACTION PERFORMANCE_ENTERPRISE NAME | DISCLOSURE |
| COMPANY X | TRANSACTION PERFORMANCE_START DATE | DISCLOSURE |
| COMPANY X | TRANSACTION PERFORMANCE_END DATE | DISCLOSURE |
| COMPANY X | TRANSACTION PERFORMANCE_TRANSACTION NUMBER | DISCLOSURE |
| COMPANY Y | TRANSACTION PERFORMANCE_ENTERPRISE NAME | NON-DISCLOSURE |
| COMPANY Y | TRANSACTION PERFORMANCE_START DATE | DISCLOSURE |
| COMPANY Y | TRANSACTION PERFORMANCE_END DATE | DISCLOSURE |
| COMPANY Y | TRANSACTION PERFORMANCE_TRANSACTION NUMBER | NON-DISCLOSURE |
| ... | ... | ... |

FIG. 4

ENTERPRISE-BY-ITEM CLASSIFICATION CODE INFORMATION 122

| SUPPLIER NAME (122a) | ITEM (122b) | CLASSIFICATION NAME (122c) | CLASSIFICATION CODE (122d) |
|---|---|---|---|
| COMPANY C | C01 | CODE 1 | 123 |
| COMPANY D | D01 | CODE 2 | 111 |
| COMPANY E | E01 | - | - |
| COMPANY F | F01 | CODE 3 | C11 |
| COMPANY G | G01 | - | - |
| COMPANY H | H01 | - | - |
| ... | ... | ... | ... |
| COMPANY A | A01 | CODE 2 | 111 |

FIG. 5

ENTERPRISE-BY-ITEM KEYWORD INFORMATION 123

123a 123b 123c

| SUPPLIER NAME | ITEM | ITEM KEYWORD |
|---|---|---|
| COMPANY C | C01 | 20 INCHES |
| COMPANY C | C01 | ALUMINUM |
| COMPANY C | C01 | VIRGIN MATERIAL |
| COMPANY D | D01 | WHEEL |
| COMPANY D | D01 | STEEL |
| COMPANY E | E01 | CHAIN |
| COMPANY F | F01 | WHEEL |
| COMPANY F | F01 | FREE WHEEL |
| COMPANY G | G01 | VEHICLE WHEEL |
| COMPANY G | G01 | REGENERATION MATERIAL |
| COMPANY H | H01 | CHAIN |
| COMPANY H | H01 | REGENERATED ITEM |
| ... | ... | ... |
| COMPANY A | A01 | 20 INCHES |
| COMPANY A | A01 | WHEEL |

FIG. 6

ACCESS PERFORMANCE INFORMATION 124

| SUPPLIER NAME (124a) | ITEM (124b) | ITEM KEYWORD (124c) | REGISTRATION DATE (124d) | NUMBER OF ACCESSES (124e) |
|---|---|---|---|---|
| COMPANY C | C01 | 20 INCHES | 20.4.1 | 200 |
| COMPANY C | C01 | ALUMINUM | 20.4.1 | 200 |
| COMPANY C | C01 | VIRGIN MATERIAL | 22.4.1 | 80 |
| COMPANY D | D01 | WHEEL | 20.9.1 | 100 |
| COMPANY D | D01 | STEEL | 20.9.1 | 100 |
| COMPANY E | E01 | CHAIN | 21.10.1 | 50 |
| COMPANY F | F01 | WHEEL | 21.6.1 | 100 |
| COMPANY F | F01 | FREE WHEEL | 22.4.1 | 50 |
| COMPANY G | G01 | VEHICLE WHEEL | 22.4.1 | 50 |
| COMPANY G | G01 | REGENERATION MATERIAL | 22.4.1 | 50 |
| COMPANY H | H01 | CHAIN | 22.8.1 | 70 |
| COMPANY H | H01 | REGENERATED ITEM | 22.8.1 | 70 |
| ... | ... | ... | ... | ... |
| COMPANY A | A01 | 20 INCHES | 23.2.1 | 15 |
| COMPANY A | A01 | WHEEL | 23.2.1 | 15 |

FIG. 7

TRANSACTION PERFORMANCE INFORMATION 125

| SUPPLIER NAME (125a) | ITEM (125b) | BUYER NAME (125c) | START DATE (125d) | END DATE (125e) | NUMBER OF TRANSACTIONS (125f) |
|---|---|---|---|---|---|
| COMPANY C | C01 | COMPANY M | 21.4.1 | - | 300 UNITS |
| COMPANY C | C01 | COMPANY N | 21.7.1 | 21.9.30 | 50 UNITS |
| COMPANY C | C01 | COMPANY P | 22.11.1 | - | 120 UNITS |
| COMPANY D | D01 | COMPANY P | 22.9.1 | - | 20 UNITS |
| COMPANY E | E01 | COMPANY Q | 21.12.1 | 23.1.1 | 10 UNITS |
| COMPANY F | F01 | COMPANY X | 20.6.1 | - | 100 UNITS |
| COMPANY F | F01 | COMPANY Y | 21.11.1 | 21.12.1 | 30 UNITS |
| COMPANY G | G01 | COMPANY N | 21.4.1 | - | 100 UNITS |
| COMPANY H | H01 | COMPANY X | 21.2.1 | 23.1.1 | 150 UNITS |
| ... | ... | ... | ... | ... | ... |

FIG. 8

RETRIEVAL TARGET INFORMATION 126

| ENTERPRISE NAME (126a) | OWN COMPANY KEYWORD (126b) | ITEM (126c) | CLASSIFICATION NAME (126d) | CLASSIFICATION CODE (126e) |
|---|---|---|---|---|
| COMPANY A | AUTOMOBILE PARTS | A01 | CODE 2 | 111 |

FIG. 9

SIMILAR ITEM KEYWORD INFORMATION 127

| ENTERPRISE NAME (127a) | ITEM (127b) | SIMILAR ENTERPRISE NAME (127c) | SIMILAR ITEM (127d) | SIMILAR ITEM KEYWORD (127e) |
|---|---|---|---|---|
| COMPANY A | A01 | COMPANY C | C01 | 20 INCHES |
| COMPANY A | A01 | COMPANY C | C01 | ALUMINUM |
| COMPANY A | A01 | COMPANY C | C01 | VIRGIN MATERIAL |
| COMPANY A | A01 | COMPANY D | D01 | WHEEL |
| COMPANY A | A01 | COMPANY D | D01 | STEEL |
| COMPANY A | A01 | COMPANY F | F01 | WHEEL |
| COMPANY A | A01 | COMPANY F | F01 | FREE WHEEL |

FIG. 10

SIMILAR RETRIEVAL RESULT INFORMATION 128

| SIMILAR ENTERPRISE NAME (128a) | SIMILAR ITEM (128b) | CLASSIFICATION NAME (128c) | CLASSIFICATION CODE (128d) |
|---|---|---|---|
| COMPANY C | C01 | CODE 1 | 123 |
| COMPANY D | D01 | CODE 2 | 111 |
| COMPANY F | F01 | CODE 3 | C11 |

| SIMILAR ENTERPRISE NAME (128e) | SIMILAR ITEM (128f) | SIMILAR ITEM KEYWORD (128g) | REGISTRATION DATE (128h) | NUMBER OF ACCESSES (128i) |
|---|---|---|---|---|
| COMPANY C | C01 | 20 INCHES | 20.4.1 | 200 |
| COMPANY C | C01 | ALUMINUM | 20.4.1 | 200 |
| COMPANY C | C01 | VIRGIN MATERIAL | 22.4.1 | 80 |
| COMPANY D | D01 | WHEEL | 20.9.1 | 100 |
| COMPANY D | D01 | STEEL | 20.9.1 | 100 |
| COMPANY F | F01 | WHEEL | 21.6.1 | 100 |
| COMPANY F | F01 | FREE WHEEL | 22.4.1 | 50 |

| SIMILAR ENTERPRISE NAME (128j) | SIMILAR ITEM (128k) | BUYER NAME (128l) | START DATE (128m) | END DATE (128n) | NUMBER OF TRANSACTIONS (128o) |
|---|---|---|---|---|---|
| COMPANY C | C01 | COMPANY M | 21.4.1 | - | 300 UNITS |
| COMPANY C | C01 | COMPANY N | 21.7.1 | 21.9.30 | 50 UNITS |
| COMPANY C | C01 | COMPANY P | 22.11.1 | - | 120 UNITS |
| COMPANY F | F01 | COMPANY X | 20.6.1 | - | 100 UNITS |

FIG. 11

RETRIEVAL HISTORY INFORMATION 129

129a 129b 129c

| BUYER NAME | RETRIEVAL KEYWORD | RETRIEVAL DATE |
| --- | --- | --- |
| COMPANY N | WHEEL | 23.3.10 9:00:00 |
| COMPANY N | WHEEL MATERIAL | 23.3.10 9:05:00 |
| COMPANY N | WHEEL REGENERATION | 23.3.10 9:15:00 |
| ... | ... | ... |

FIG. 12

ACCESS HISTORY INFORMATION 130

130a 130b 130c 130d

| BUYER NAME | ACCESS SUPPLIER NAME | ACCESS ITEM | DATE AND TIME OF ACCESS |
| --- | --- | --- | --- |
| COMPANY N | COMPANY D | D01 | 23.3.10 9:02:00 |
| COMPANY N | COMPANY F | F01 | 23.3.10 9:04:00 |
| COMPANY M | COMPANY A | A01 | 23.3.15 16:00:00 |
| ... | ... | ... | ... |

FIG. 13

ACCESS ENTERPRISE-ITEM INFORMATION 131

| NON-ACCESS SUPPLIER NAME (131a) | NON-ACCESS ITEM (131b) | ACCESS SUPPLIER NAME (131c) | ACCESS ITEM (131d) |
|---|---|---|---|
| COMPANY A | A01 | COMPANY D | D01 |
| COMPANY A | A01 | COMPANY F | F01 |
| ... | ... | ... | ... |

FIG. 14

ADDITIONAL RETRIEVAL KEYWORD INFORMATION 132

| SUPPLIER NAME (132a) | ITEM (132b) | ADDITIONAL RETRIEVAL KEYWORD (132c) | RETRIEVAL FREQUENCY (132d) |
|---|---|---|---|
| COMPANY A | A01 | MATERIAL | 4 |
| COMPANY D | D01 | MATERIAL | 3 |
| COMPANY F | F01 | MATERIAL | 3 |
| COMPANY A | A01 | REGENERATION | 5 |
| ... | ... | ... | ... |

FIG. 15

RECOMMEND INFORMATION 133

| ADDITIONAL RETRIEVAL KEYWORD (133a) | RETRIEVAL FREQUENCY (133b) | KEYWORD REGISTERED SUPPLIER NAME (133c) | KEYWORD REGISTERED ITEM (133d) |
|---|---|---|---|
| MATERIAL | 4 | COMPANY G | G01 |
| REGENERATION | 5 | COMPANY G | G01 |
| REGENERATION | 5 | COMPANY H | H01 |

| SUPPLIER NAME (133e) | ITEM (133f) | CLASSIFICATION NAME (133g) | CLASSIFICATION CODE (133h) |
|---|---|---|---|
| COMPANY A | A01 | CODE 2 | 111 |
| COMPANY D | D01 | CODE 2 | 111 |
| COMPANY F | F01 | CODE 3 | C11 |
| COMPANY G | G01 | - | - |
| COMPANY H | H01 | - | - |

| SUPPLIER NAME (133i) | ITEM (133j) | ITEM KEYWORD (133k) | REGISTRATION DATE (133l) | NUMBER OF ACCESSES (133m) |
|---|---|---|---|---|
| COMPANY A | A01 | 20 INCHES | 23.2.1 | 15 |
| COMPANY A | A01 | WHEEL | 23.2.1 | 15 |
| COMPANY D | D01 | WHEEL | 20.9.1 | 100 |
| COMPANY D | D01 | STEEL | 20.9.1 | 100 |
| COMPANY F | F01 | WHEEL | 21.6.1 | 100 |
| COMPANY F | F01 | FREE WHEEL | 22.4.1 | 50 |
| COMPANY G | G01 | VEHICLE WHEEL | 22.4.1 | 50 |
| COMPANY G | G01 | REGENERATION MATERIAL | 22.4.1 | 50 |
| COMPANY H | H01 | CHAIN | 22.8.1 | 70 |
| COMPANY H | H01 | REGENERATED ITEM | 22.8.1 | 70 |

| SUPPLIER NAME (133n) | ITEM (133o) | TRANSACTION PARTNER BUYER NAME (133p) | TRANSACTION START DATE (133q) | TRANSACTION END DATE (133r) | NUMBER OF TRANSACTIONS (133s) |
|---|---|---|---|---|---|
| COMPANY D | D01 | COMPANY P | 22.9.1 | - | 20 UNITS |
| COMPANY F | F01 | COMPANY X | 20.6.1 | - | 100 UNITS |
| COMPANY F | F01 | COMPANY Y | 21.11.1 | 21.12.1 | 30 UNITS |
| COMPANY G | G01 | COMPANY N | 21.4.1 | - | 100 UNITS |
| COMPANY H | H01 | COMPANY X | 21.2.1 | 23.1.1 | 150 UNITS |

RETRIEVAL METHOD AND RETRIEVAL DEVICE

CLAIM OF PRIORITY

The present application claims priority from Japanese patent application JP 2023-113180 filed on Jul. 10, 2023, the content of which is hereby incorporated by reference into this application.

TECHNICAL FIELD

The present invention relates to a technology to assist in retrieving suppliers.

BACKGROUND ART

In the manufacturing industry, a supply chain comprised of multiple enterprises such as a supplier, a factory and a sales company synchronizes to meet market demands. In recent years, the risk of disrupting supply chain synchronization has increased. Typical risks which can affect supply chains include various risks such as environmental risks typified by natural disasters and pandemics, geopolitical risks such as terrorism and political instability, economic risks such as economic crises and raw material price fluctuations, and technical risks such as cyber-attacks and system failures. When these risks occur and a problem occurs with a transaction supplier, it is necessary to immediately switch suppliers. Also, when selecting a new supplier, it is necessary to consider the impact of the above risks when selecting a supplier. When a buyer searches for a supplier, the supplier needs to disclose sufficient information for the buyer to determine whether the supplier can supply the item/specification that the buyer desires to procure. On the other hand, for the suppliers, in order to make it easier for buyers to retrieve targets, it is necessary to confirm whether the information that the buyers are looking for has been registered, and confirm whether the information representing their product's differentiation and superiority from those of other companies has been registered, and to register the information. Even after registration, it is desirable for the suppliers to update the information necessary for retrieval in response to changes in buyer needs or other companies' product lineups.

As a technique for retrieving a supplier, there are conventional techniques such as, for example, Japanese Unexamined Patent Application Publication No. 2019-212016 (Patent Document 1) and International Publication No. WO 2017/212667 (Patent Document 2).

There has been described in Patent Document 1, a technique in which "a transaction management system is provided by a buyer enterprise, which allows a buyer enterprise to search for an appropriate candidate supplier enterprise from information on the existing supplier enterprises and new supplier enterprises. (omitted) when a data registration function detects category information with respect to an unregistered item name code in item name information, it registers the detected category information. When the category matching function detects category relationships in the category information registered by the data registration function, information indicating the degree of association is registered in the category relationship information" (refer to Abstract).

There has been described in Patent Document 2, a technique in which "a matching unit selects a supplier from the supplier enterprise information based on the purchase desired information as a selected supplier. Further, the matching unit determines the degree of matching at which the specification of a supply product supplied from the selected supplier and the specification of a purchase desired product are matched" (refer to Abstract).

CITATION LIST

Patent Literature

Patent Literature 1: Japanese Unexamined Patent Application Publication No. 2019-212016
Patent Literature 2: International Publication No. WO 2017/212667

SUMMARY OF INVENTION

Technical Problem

The technique described in Patent Document 1 has a function of registering data from information such as electronic commerce, and a matching function which shows the degree of relationship of category information between a buyer and a supplier, but does not have a function of updating registered contents. It may be difficult to quickly match the buyer and the supplier. Further, the technique described in Patent Document 2 described above has a function of matching the specifications of the product desired to purchase and the specifications of the supplied product to retrieve the appropriate supplier, but does not describe any means for prompting the specification to be revised or updated in the case where the method of writing the specification is different or the content is missing. It may be difficult to quickly match between the buyer and the supplier.

Therefore, an object of the present invention is to register information which allows a buyer to determine whether a product or enterprise is suitable as a business partner when retrieving an alternative supplier or a new transaction partner supplier, and appropriately register and update information describing supply items so that a supplier is frequently hit in the buyer retrieval, and information representing differentiation and superiority from other companies can be registered.

Solution to Problem

In order to solve at least one of the above problems, the present invention is a retrieval method executed by a retrieval device having a processing section and a storage unit. The storage unit holds enterprise information including a business keyword indicating a business of each enterprise, classification code information indicating the classification of each item, and item keyword information including the enterprise and an item keyword corresponding to an item of a particle supplied by the enterprise. The retrieval method includes: a first procedure of allowing the processing section to receive at least one of a keyword indicative of a business of a first enterprise or a classification code of an item registered by the first enterprise as an input; a second procedure of allowing the processing section to extract the at least one item keyword corresponding to at least one of an enterprise similar to the first enterprise or an item similar to the item registered by the first enterprise, based on at least one of the keyword indicating the business of the first enterprise or the classification code of the item registered by the first enterprise, by referring to the enterprise information, the classification code information, and the item keyword information; and a third procedure of allowing the processing section to output the extracted at least one item keyword.

Advantageous Effects of Invention

According to one aspect of the present invention, enterprise matching can be accelerated by proposing to a supplier the setting of keywords which is easily retrieved without being buried in other companies' information. Problems, configurations, and effects other than those described above will be made clear by the description of the following embodiments.

BRIEF DESCRIPTION OF DRAWINGS

FIG. 2 is a diagram showing an example of a data structure of enterprise information held by a supplier retrieval device according to the embodiment of the present invention.

FIG. 3 is a diagram showing an example of a data structure of secret information held by the supplier retrieval device according to the embodiment of the present invention.

FIG. 4 is a diagram showing an example of a data structure of enterprise-by-item classification code information held by the supplier retrieval device according to the embodiment of the present invention.

FIG. 5 is a diagram showing an example of a data structure of enterprise-by-item keyword information held by the supplier retrieval device according to the embodiment of the present invention.

FIG. 6 is a diagram showing an example of a data structure of access performance information held by the supplier retrieval device according to the embodiment of the present invention.

FIG. 7 is a diagram showing an example of a data structure of transaction performance information held by the supplier retrieval device according to the embodiment of the present invention.

FIG. 8 is a diagram showing an example of a data structure of retrieval target information held by the supplier retrieval device according to the embodiment of the present invention.

FIG. 9 is a diagram showing an example of a data structure of similar item keyword information held by the supplier retrieval device according to the embodiment of the present invention.

FIG. 10 is a diagram showing an example of a data structure of similar retrieval result information held by the supplier retrieval device according to the embodiment of the present invention.

FIG. 11 is a diagram showing an example of a data structure of retrieval history information held by the supplier retrieval device according to the embodiment of the present invention.

FIG. 12 is a diagram showing an example of a data structure of access history information held by the supplier retrieval device according to the embodiment of the present invention.

FIG. 13 is a diagram showing an example of a data structure of access enterprise-item information held by the supplier retrieval device according to the embodiment of the present invention.

FIG. 14 is a diagram showing an example of a data structure of additional retrieval keyword information held by the supplier retrieval device according to the embodiment of the present invention.

FIG. 15 is a diagram showing an example of a data structure of recommend information held by the supplier retrieval device according to the embodiment of the present invention.

DESCRIPTION OF EMBODIMENTS

Embodiments will hereinafter be described, but the scope of the present invention is not limited to the embodiments.

Hereinafter, an embodiment of the present invention will be described with reference to the drawings. In the present embodiment, a supplier sets and updates keywords which describe target articles supplied from a supplier to a buyer. The target articles may include, for example, parts and material parts for an automobile, an electrical appliance, a mechanical product, elevator equipment, a train, an aircraft, a generator, a control device, a control panel, a storage device, a network storage such as a NAS (Network Attached Storage), a server, a water treatment device, etc., but are not limited to these.

Figure 1:
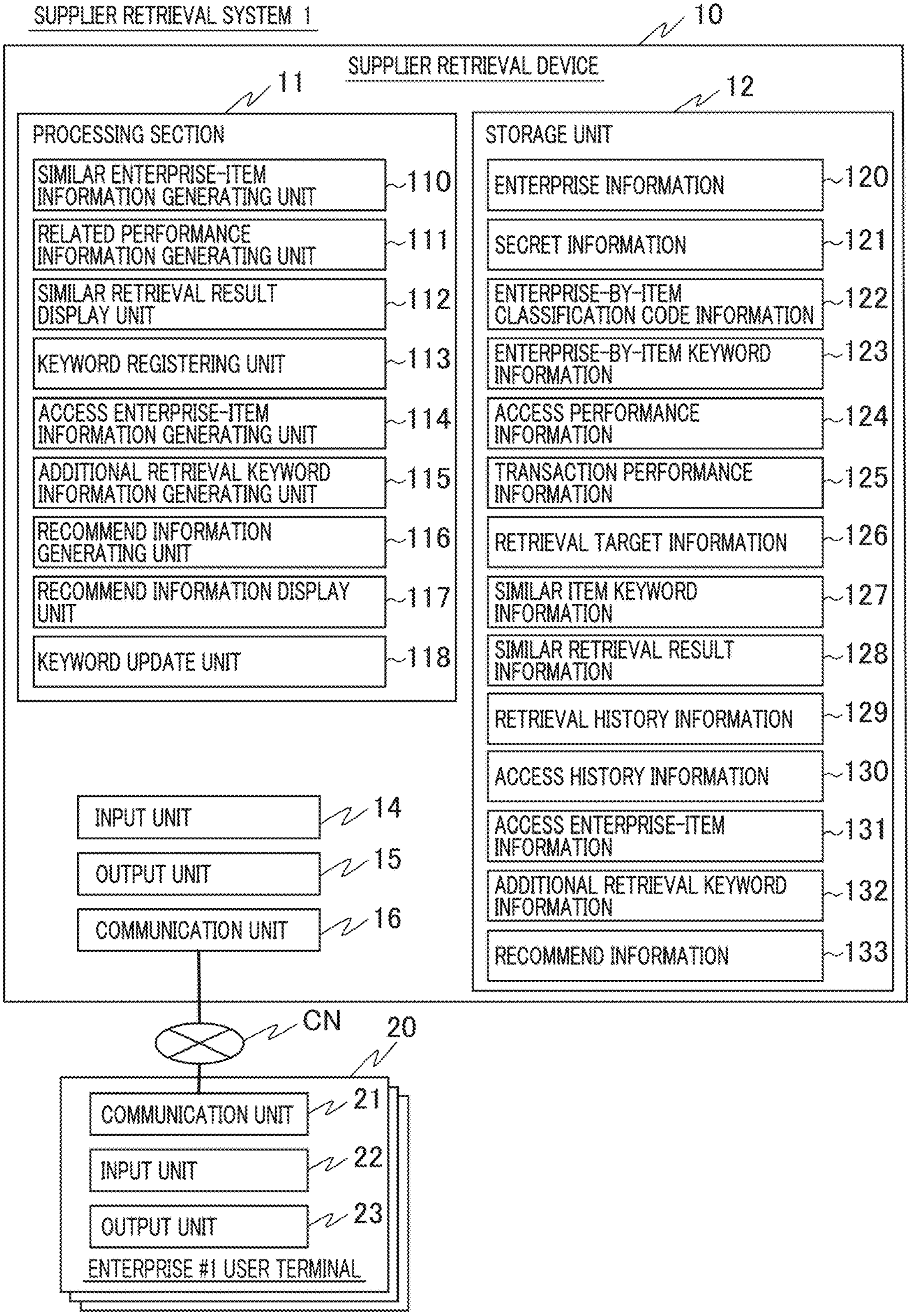
FIG. 1 is a functional block diagram showing an example of a configuration of a supplier retrieval system according to an embodiment of the present invention.

FIG. 1 is a functional block diagram showing an example of a configuration of a supplier retrieval system 1 according to an embodiment of the present invention.

The supplier retrieval system 1 includes a supplier retrieval device 10 and user terminals 20 of each enterprise, both of which are communicably connected via a network CN. The user terminal 20 of each enterprise includes a communication unit 21, an input unit 22, and an output unit 23. The user terminal 20 is an information processing device such as a PC (Personal Computer), and is operated by a user of a supplier retrieval service provided by the supplier retrieval device 10. The communication unit 21 transmits and receives information between devices connected via the network CN. The input unit 22 receives the input of information to the user terminal 20 via an input device such as a keyboard or a touch panel. The output unit 23 outputs information to an output device such as a display.

The network CN communicably connects the supplier retrieval device 10 and the user terminal 20. The network CN is, for example, either a LAN (Local Area Network), a WAN (Wide Area Network), a VPN (Virtual Private Network), or a communication network that partially or entirely uses a general public line such as Internet.

The supplier retrieval device 10 is an information processing device such as a PC or a server computer. The supplier retrieval device 10 includes a processing section 11, a storage unit 12, an input unit 14, an output unit 15, and a communication unit 16.

The processing section 11 includes a similar enterprise-item information generating unit 110, related performance information generating unit 111, a similar retrieval result display unit 112, a keyword registering unit 113, an access enterprise-item information generating unit 114, an additional retrieval keyword information generating unit 115, a recommend information generating unit 116, a recommend information display unit 117, and a keyword update unit 118.

The similar enterprise-item information generating unit 110 generates similar enterprise-item information from enterprise information, enterprise-by-item classification code information, and enterprise-by-item keyword information to be described later with respect to retrieval target information received from the supplier and stores the created similar item keyword information 127 in the storage unit 12.

The related performance information generating unit 111 generates the number of accesses and transaction performance information for each similar item keyword from access performance information and transaction performance information to be described later with respect to the above similar item keyword information 127 and stores the created similar retrieval result information 128 in the storage unit 12.

The similar retrieval result display unit 112 outputs the above similar retrieval result information 128 to a supplier's terminal (for example, any user terminal 20). At this time, the similar retrieval result display unit 112 performs concealment processing on information of non-disclosure items based on secret information 121 to be described later and then outputs the information.

The keyword registering unit 113 stores a keyword describing each item received from the supplier in the enterprise-by-item keyword information 123.

The access enterprise-item information generating unit 114 generates information indicating that already registered items are included in a buyer's retrieval result but are not accessed by the buyer, and items from other enterprises are accessed, from retrieval history information 129 and access history information 130 to be described later, and stores the generated information in the storage unit 12 as access enterprise-item information 131.

The additional retrieval keyword information generating unit 115 generates additional retrieval keyword information 132 indicative of keywords used in additional retrieval from the retrieval history information 129 and the access history information 130 after the already registered items are included in the buyer's retrieval result, and stores the generated additional retrieval keyword information 132 in the storage unit 12.

The recommend information generating unit 116 generates recommend information including access status/transaction performance information for currently registered keywords, keywords and their access status/transaction performance information for enterprises-items related to the registered keywords, and additionally retrieved keywords and retrieval frequency/transaction performance information from the access enterprise-item information 131, additional retrieval keyword information 132, enterprise-by-item classification code information 122, enterprise-by-item keyword information 123, access performance information 124, and transaction performance information 125, and stores the generated recommend information in the storage unit 12.

The recommend information display unit 117 outputs the recommend information 133 to the supplier's terminal. At this time, the recommend information display unit 117 performs concealment processing on the information of non-disclosure items, based on the secret information 121 to be described later and then outputs the information.

The keyword update unit 118 stores the updated content of the keyword describing an item received from the supplier in the enterprise-by-item keyword information 123.

The storage unit 12 stores the enterprise information 120, secret information 121, enterprise-by-item classification code information 122, enterprise-by-item keyword information 123, access performance information 124, transaction performance information 125, retrieval target information 126, similar item keyword information 127, similar retrieval result information 128, retrieval history information 129, access history information 130, access enterprise-item information 131, additional retrieval keyword information 132, and recommend information 133.

The enterprise information 120 is information indicating whether or not each enterprise is a supplier or a buyer, and information indicating what kind of business each enterprise is performing.

FIG. 2 is a diagram showing an example of a data structure of the enterprise information 120 held by the supplier retrieval device 10 according to the embodiment of the present invention.

The enterprise information 120 includes an enterprise name 120*a*, a category 120*b*, and a business keyword 120*c*. The enterprise name 120*a* is a name that identifies each enterprise. The category 120*b* indicates whether each enterprise is a supplier or a buyer. The business keyword 120*c* is a keyword indicative of the business that each enterprise is conducting. Generally, a plurality of keywords indicating one business conducted by one enterprise may be recorded. Also, one enterprise may engage in multiple businesses. Further, one enterprise may be both a supplier and a buyer. Information related to them is registered in the enterprise information 120.

For example, when an enterprise called a company C is a supplier supplying parts for automobiles, a "supplier" may be registered as the category 120*b* corresponding to "Company C", and "automobile" and "parts" may be registered as the business keywords 120*c*, respectively.

The secret information 121 is information related to the conditions under which each enterprise has decided whether or not it can disclose various information to other enterprises.

FIG. 3 is a diagram showing an example of a data structure of the secret information 121 held by the supplier retrieval device 10 according to the embodiment of the present invention.

The secret information 121 includes an enterprise name 121*a*, an item 121*b*, and a disclosure/non-disclosure 121*c*. Information corresponding to the enterprise name 121*a* and the item 121*b* of the "non-disclosure" of the disclosure/non-disclosure 121*c* is subjected to concealment processing so that the content of the information cannot be identified when outputting it to the user terminal 20.

The enterprise-by-item classification code information 122 is information regarding a classification code of each item of the supplier.

FIG. 4 is a diagram showing an example of a data structure of the enterprise-by-item classification code information 122 held by the supplier retrieval device 10 according to the embodiment of the present invention.

The enterprise-by-item classification code information 122 includes a supplier name 122*a*, an item 122*b*, a classification name 122*c*, and a classification code 122*d*. The classification code applied in the present invention may be of any type, but may be, for example, the UNSPSC (United Nations Standard Product Service Code) or HS code (Customs Classification Number) or the like. In that case, the classification name 122*c* designates either the UNSPSC or the HS code, and the classification code 122*d* indicates a specific code in a designated classification code system, of the item supplied by each supplier enterprise.

Here, when "_" is described in the classification name 122*c* and the classification code 122*d*, it indicates that the classification name or the classification code is not registered. Further, the classification code 122*d* for each of a plurality of the classification names 122*c* may be registered for one item.

The enterprise-by-item keyword information 123 is information regarding keywords which describe each item of the supplier.

FIG. 5 is a diagram showing an example of a data structure of the enterprise-by-item keyword information 123 held by the supplier retrieval device 10 according to the embodiment of the present invention.

The enterprise-by-item keyword information 123 includes a supplier name 123*a*, an item 123*b*, and an item keyword 123*c*. The supplier name 123*a* is a name which identifies an enterprise that is a supplier. The item 123*b* indicates the item of articles supplied by each supplier enterprise. The item keyword 123*c* is a keyword that describes the article supplied by each supplier enterprise, for example, a keyword indicating specifications, properties, uses, etc. The enterprise-by-item keyword information 123 can be updated while operating the supplier retrieval system 1 as will be described later.

The access performance information 124 is information about access performance from a buyer with respect to each item keyword registered in the enterprise-by-item keyword information 123.

FIG. 6 is a diagram showing an example of a data structure of the access performance information 124 held by the supplier retrieval device 10 according to the embodiment of the present invention.

The access performance information 124 includes a supplier name 124*a*, an item 124*b*, an item keyword 124*c*, a registration date 124*d*, and an access number 124*e*. The supplier name 124*a* through the item keyword 124*c* correspond to the supplier name 123*a* through the item keyword 123*c* of the enterprise-by-item keyword information 123, respectively. The registration date 124*d* indicates the date when each item keyword is registered. The access number 124*e* represents a cumulative value of the number of times that from the time of registration until today, a buyer has retrieved a supplier using the item keyword and accessed the supplier's item page.

The transaction performance information 125 is information related to the transaction performance between the supplier and the buyer.

FIG. 7 is a diagram showing an example of a data structure of the transaction performance information 125 held by the supplier retrieval device 10 according to the embodiment of the present invention.

The transaction performance information 125 includes a supplier name 125*a*, an item 125*b*, a buyer name 125*c*, a start date 125*d*, an end date 125*e*, and a transaction number 125*f*. The supplier name 125*a* is a name which identifies each supplier enterprise. The item 125*b* indicates the item of articles to be transacted, which are supplied by the supplier enterprise. The buyer name 125*c* is a name which identifies a buyer enterprise that transacted the item with the supplier enterprise. The start date 125*d* and the end date 125*e* indicate the start and end dates of the transaction, and the transaction number 125*f* indicates the number of articles traded in the transaction. Here, when "_" is described in the end date 125*e*, it shows that the transaction is still ongoing. Then, the transaction number 125*f* represents a cumulative value of the transaction number from the start date to the end date. Note that the end date of the transaction may be inferred from the past transaction performance information.

The retrieval target information 126 includes information on keywords which are input for retrieval when registering or updating the keywords.

FIG. 8 is a diagram showing an example of a data structure of the retrieval target information 126 held by the supplier retrieval device 10 according to the embodiment of the present invention.

For example, when a person in charge of a certain supplier enterprise (company A in the present embodiment) tries to set a keyword related to an article supplied by the own company to the supplier retrieval device 10, it is assumed that the person will conduct a retrieval to obtain reference information. At this time, the retrieval target information 126 is generated based on the retrieval keyword input by the user (the person in charge of the supplier enterprise in this example).

The retrieval target information 126 includes an enterprise name 126*a*, an own company keyword 126*b*, an item 126*c*, a classification name 126*d*, and a classification code 126*e*. The enterprise name 126*a* is a name which identifies the own company. The own company keyword 126*b* is a keyword related to the business of the own company, and may be a business keyword 120*c* registered in the enterprise information 120, for example. A plurality of keywords may be input to the own company keyword 126*b*. In that case, keywords may be separated by blank characters, or symbols such as commas or #may be used as identifiers.

The item 126*c*, the classification name 126*d*, and the classification code 126*e* indicate the item of each own company's article for which a keyword is to be set from now on, and its corresponding classification code. Further, when the corresponding classification name 126*d* and classification code 126*e* are not input, "-" is displayed.

The example of FIG. 8 shows information input when attempting to set a keyword for an item of A01 supplied by a supplier enterprise called a company A. In this example, an "automobile" and a "part" corresponding to the business keyword 120*c* of the company A are input as the own company keyword 126*b*. Then, "code 2" which is the classification name 122*c* of A01 of the company A, and "111" which is the classification code 122*d* are input as the classification name 126*d* and the classification code 126*e*, respectively.

The similar item keyword information 127 is information about an enterprise-item that is similar to the enterprise-item combination (hereinafter also referred to as "enterprise-item") included in the retrieval target information 126, and a keyword set for the item. That is, the similar item keyword information 127 includes information related to enterprises, items, and keywords obtained as a result of the retrieval based on the retrieval target information 126.

FIG. 9 is a diagram showing an example of a data structure of the similar item keyword information 127 held by the supplier retrieval device 10 according to the embodiment of the present invention.

The similar item keyword information 127 includes an enterprise name 127*a*, an item 127*b*, a similar enterprise name 127*c*, a similar item name 127*d*, and a similar item keyword 127_e_. The enterprise name 127_a_ and the item 127_b_ indicate the enterprise and item to be retrieved. The similar enterprise name 127_c_, the similar item name 127_d_, and the similar item keyword 127_e_ indicate the enterprise, item, and keyword registered corresponding to the item obtained by the retrieval.

FIG. 9 shows an example of a retrieval result obtained when a retrieval keyword related to A01 of the company A is input as shown in FIG. 8. In this case, the enterprise name 127_a_ and the item 127_b_ become "company A" and "A01", respectively. Then, the similar enterprise name 127_c_, the similar item name 127_d_, and the similar item keyword 127_e_ show that "20 inches", "aluminum", and "virgin material" as keywords registered for "C01" of "company C", "wheel" and "steel" as keywords registered for "D01" of "company D", and "wheel" and "free wheel" as keywords registered for "F01" of "company F" are obtained as retrieval results.

The similar retrieval result information 128 is information obtained by adding the access performance information 124 and the transaction performance information 125 to the similar item keyword information 127.

FIG. 10 is a diagram showing an example of a data structure of the similar retrieval result information 128 held by the supplier retrieval device 10 according to the embodiment of the present invention.

The similar retrieval result information 128 includes a similar enterprise name 128_a_, a similar item 128_b_, a classification name 128_c_, a classification code 128_d_, a similar enterprise name 128_e_, a similar item 128_f_, a similar item keyword 128_g_, a registration date 128_h_, the number of accesses 128_i_, a similar enterprise name 128_j_, a similar item 128_k_, a buyer name 128_l_, a start date 128_m_, an end date 128_n_, and the number of transactions 128_o_. Details of these will be described later (refer to the description of FIG. 16).

The retrieval history information 129 is information regarding a keyword retrieved by an enterprise being a buyer and the date and time when the retrieval is conducted.

FIG. 11 is a diagram showing an example of a data structure of the retrieval history information 129 held by the supplier retrieval device 10 according to the embodiment of the present invention.

The retrieval history information 129 includes a buyer name 129_a_, a retrieval keyword 129_b_, and a retrieval date and time 129_c_. A plurality of keywords may be input in the retrieval keyword 129_b_. In that case, the keywords may be separated by blank characters, or symbols such as commas and #may be used as identifiers.

The example of FIG. 11 shows that a company N being a buyer first performs retrieval using a keyword "wheel", then performs retrieval using keywords "wheel" and "material", and then performs retrieval using keywords "wheel" and "regeneration".

The access history information 130 is information about item information of an accessed supplier and the accessed data and time when the buyer retrieves a supplier and actually accesses the retrieval result.

FIG. 12 is a diagram showing an example of a data structure of the access history information 130 held by the supplier retrieval device 10 according to the embodiment of the present invention.

The access history information 130 includes a buyer name 130_a_, an access supplier name 130_b_, an access item 130_c_, and the date and time of access 130_d_.

The access enterprise-item information 131 is information indicating what the enterprise-item actually accessed is where a buyer retrieves a supplier and among the enterprise-items displayed in the retrieval result, there are an enterprise-item not accessed from the buyer and an enterprise-item accessed from the buyer.

The example in FIG. 12 shows that a company N being a buyer accesses the enterprise-item "D01" of "company D" at "Mar. 10, 2023, 9:02:00". Similarly, the example of FIG. 12 includes information indicating which enterprise-items and when company N and other buyer enterprises have accessed each.

FIG. 13 is a diagram showing an example of a data structure of the access enterprise-item information 131 held by the supplier retrieval device 10 according to the embodiment of the present invention.

The access enterprise-item information 131 includes a non-access supplied name 131_a_, a non-access item 131_b_, an access supplier name 131_c_, an access item 131_d_, and an item keyword 131_e_.

The first line of the example in FIG. 13 indicates that as a result of a buyer retrieving a supplier, "A01" of "company A" and "D01" of "company D" were obtained as retrieval results, and the buyer obtains access to "D01" of "company D", but did not access to "A01" of "company A". Similarly, the second line indicates that as a result of a buyer retrieving a supplier, "A01" of "company A" and "F01" of "company F" were obtained as retrieval results, and the buyer obtains access to "F01" of "company F", but did not access to "A01" of "company A".

The additional retrieval keyword information 132 is information about keywords when a buyer retrieves a supplier and enterprises-items included in the retrieval results are additionally retrieved in a subsequent supplier retrieval.

FIG. 14 is a diagram showing an example of a data structure of the additional retrieval keyword information 132 held by the supplier retrieval device 10 according to the embodiment of the present invention.

The additional retrieval keyword information 132 includes a supplier name 132_a_, an item 132_b_, an additional retrieval keyword 132_c_, and a retrieval frequency 132_d_.

The first line of the example in FIG. 14 indicates that a buyer enters a certain keyword to retrieve a supplier, and as a result, "A01" of "company A" was obtained as a retrieval result, and the buyer further adds the keyword "material" to conduct retrieval, and that such retrieval was performed four times in the past. Similarly, the second line indicates that after "D01" of "company D" was obtained as a retrieval result, retrieval added with the keyword "material" was further conducted, and that such retrieval was performed three times. Further, the third line indicates that after "F01" of "company F" was obtained as a retrieval result, retrieval added with the keyword "material" was further conducted, and that such retrieval was conducted three times.

For example, as shown in FIG. 11, a company N being a buyer first performs retrieval by entering the keyword "wheel". After the retrieval results "A01" of "company A", "D01" of "company D", and "F01" of "company F" were obtained, the company N further adds the keyword "material" to conduct retrieval, so that the retrieval results "D01" of "company D" and "F01" of "company F" are obtained. When the company N accesses these two enterprise-items, such information as illustrated in FIGS. 12 and 13 is obtained.

When "D01" of "company D" and "F01" of "company F" are the same type of articles as "A01" of "company A", and the company A wants to do business with the company N (or an enterprise which performs business similar to the company N), a keyword including "material" (e.g., aluminum material, regenerated material, or the like) is added to "A01" of "company A" to make a hit in the retrieval, whereby it can be expected that the possibility of receiving access from the buyer enterprise will increase.

The recommend information 133 is information about the access status and additionally-retrieved keywords for the currently registered enterprise-item keywords.

FIG. 15 is a diagram showing an example of a data structure of the recommend information 133 held by the supplier retrieval device 10 according to the embodiment of the present invention.

The recommend information 133 is comprised of four tables. First, the first table stores additionally retrieved keyword information, a retrieval frequency, and information indicating what the enterprise-item for which the keyword is registered is, with respect to the enterprise-items to be retrieved (additional retrieval keyword 133*a*, the number of retrievals 133*b*, keyword registered supplier name 133*c*, and keyword registered item 133*d*). The second table stores information indicating the classification names and classification codes of enterprise-items to be retrieved and related enterprise-items (supplier name 133*e*, item 133*f*, classification name 133*g*, and classification code 133*h*). The third table stores information stores information indicating keywords, the date when the keywords are registered, and cumulative access numbers of enterprise-items to be retrieved and related enterprise-items (supplier name 133*i*, item 133*j*, item keyword 133*k*, registration date 133*l*, and the number of accesses 133*m*). The final fourth table stores information indicating a transaction partner buyer, a transaction start date, a transaction end date, and a cumulative transaction number of an enterprise-item to be retrieved and a related enterprise-item (supplier name 133*n*, item 133*o*, transaction partner buyer name 133*p*, transaction start date 133*q*, transaction end date 133*r*, and the number of transactions 133*s*). Details of these will be described later (refer to the description of FIG. 18).

The input unit 14 is displayed and operated on a screen, for example, and receives the input of information to the supplier retrieval device 10 via an input device such as a keyboard, a touch panel, a mouse or the like.

The output unit 15 outputs, for example, screen information including the result of execution of predetermined processing to an output device such as a display.

The communication unit 16 transmits and receives information to and from the user terminal 20 connected via the network CN.

Figure 16:
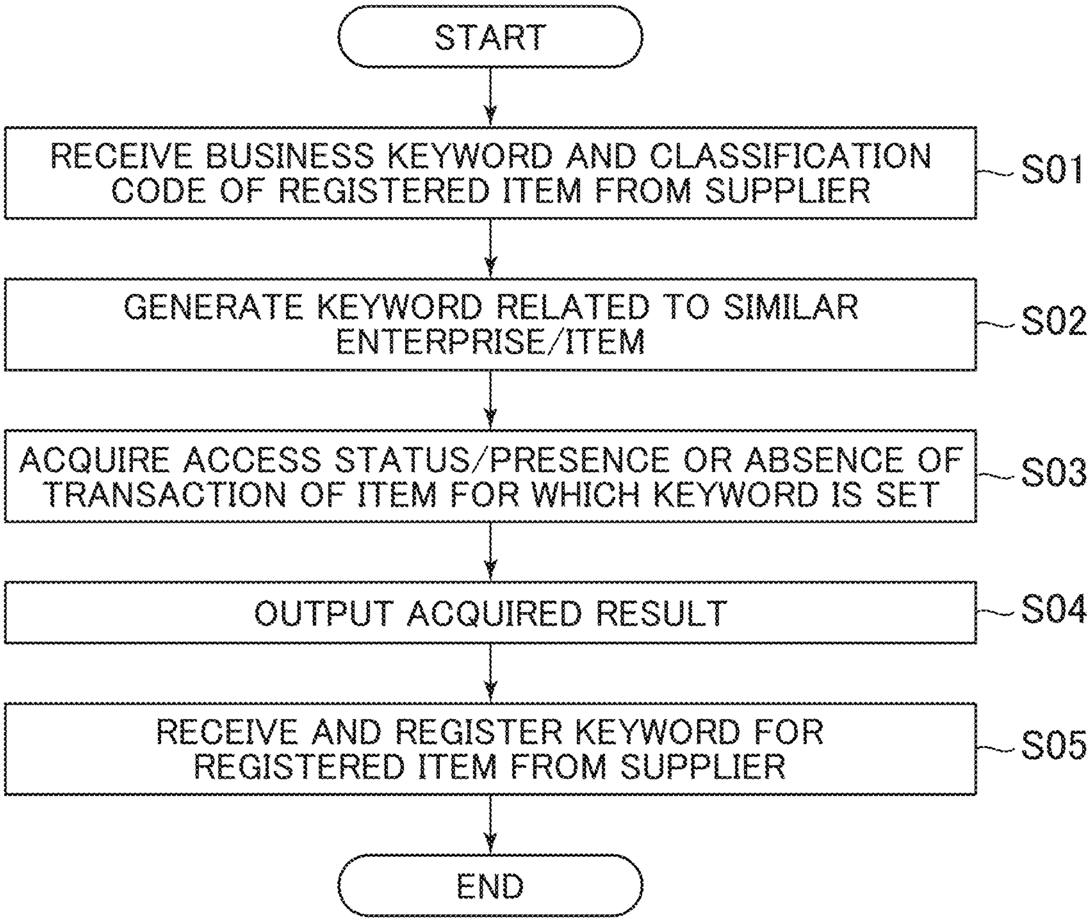
FIG. 16 is a flow chart showing an example of keyword registration processing executed by the supplier retrieval device according to the embodiment of the present invention.

FIG. 16 is a flow chart showing an example of keyword registration processing executed by the supplier retrieval device 10 according to the embodiment of the present invention.

The present processing is started when the supplier retrieval device 10 is called up from the user terminal 20 of each enterprise at the timing taken when the supplier registers a keyword to describe the item.

First, the input unit 14 receives the retrieval target information 126 from an enterprise and stores it in the storage unit 12 (Step S01). Here, the screen displayed when processing is executed will be described.

Figure 17:
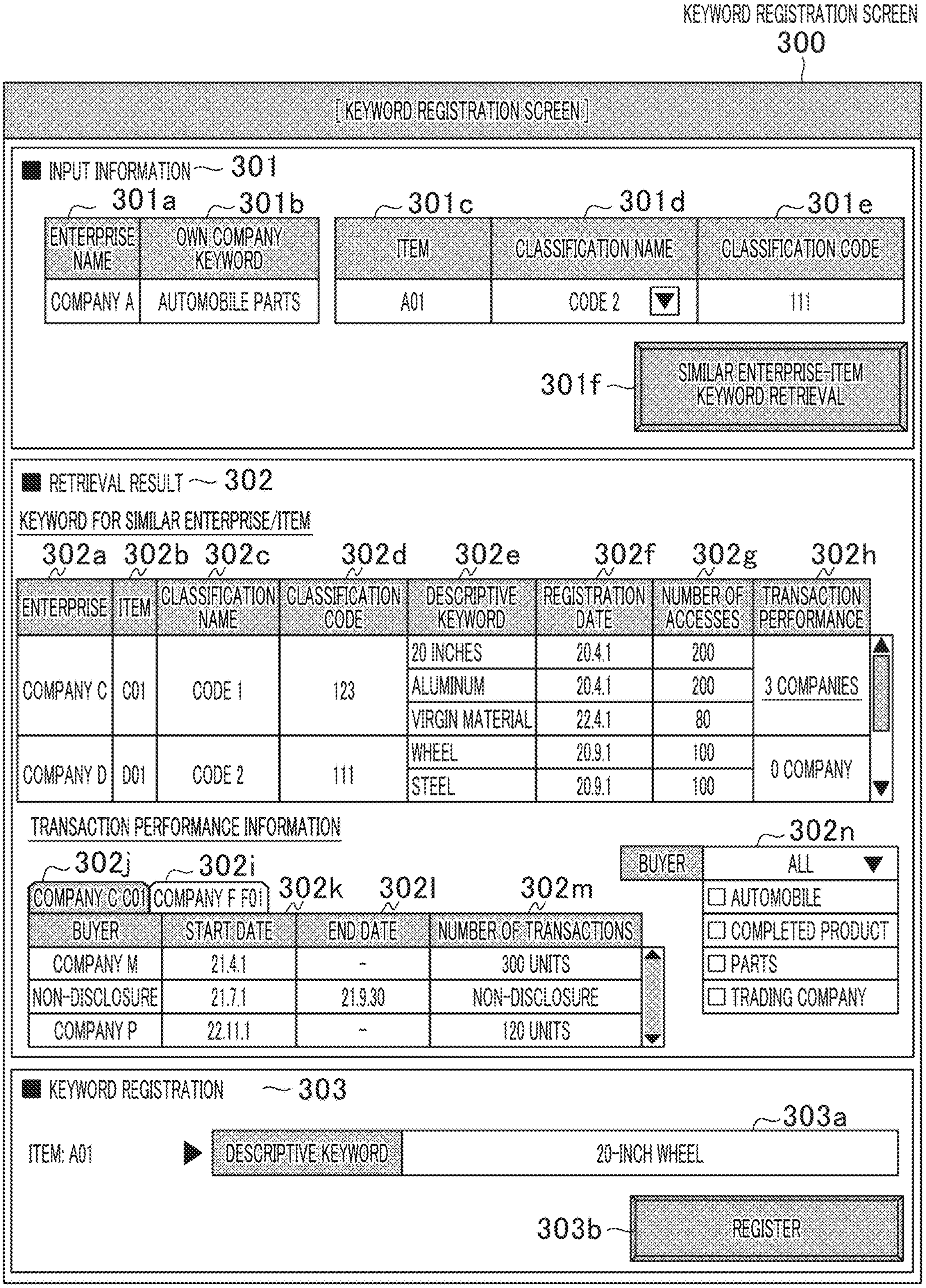
FIG. 17 is a diagram showing an example of a screen displayed when a supplier registers a keyword for an item, in the embodiment of the present invention.

FIG. 17 is a diagram showing an example of a screen displayed when a supplier registers a keyword for an item in the embodiment of the present invention.

For example, when the user terminal 20 of a supplier enterprise that is about to register a keyword calls the supplier retrieval device 10, a keyword registration screen 300 is displayed by the output unit 23 of the user terminal 20. The keyword registration screen 300 includes an input information area 301 which accepts the input of the retrieval target information 126 from an enterprise, a retrieval result area 302 which displays retrieval results to be described later, and a keyword registration area 303 where the supplier sets a keyword for the item in response to the retrieval results.

In Step S01, the input information area 301 is used. The input information area 301 includes an enterprise name 301*a*, an own company keyword 301*b*, an item 301*c*, a classification name 301*d*, a classification code 301*e*, and a retrieval button 301*f*. The supplier enterprise inputs information from the enterprise name 301*a* to the classification code 301*e* and operates the retrieval button 301*f* to generate the retrieval target information 126 including the information from the input enterprise name 301*a* through the classification code 301*e* as the enterprise name 126*a* through the classification code 126*e* respectively. In the present example, since the company A is trying to set the item keyword regarding the item A01, such retrieval target information 126 as shown in FIG. 8 is generated.

Incidentally, in addition to this, the screen for inputting the retrieval target information is not limited to the form shown in the input information area 301 of FIG. 17.

Refers again to FIG. 16. The similar enterprise-item information generating unit 110 reads the enterprise information 120, the enterprise-by-item classification code information 122, the enterprise-by-item keyword information 123 and the retrieval target information 126 from the storage unit 12 to generate keywords related to similar enterprise-items (Step S02). Specifically, the similar enterprise-item information generating unit 110 performs processing of generating keywords based on the own company keywords and processing of generating keywords based on the classification name/classification codes.

First, the similar enterprise-item information generating unit 110 extracts an enterprise name for which a similar business keyword is set, from the enterprise information 120, based on the own company keyword 126*b* of the retrieval target information 126. In the present example, the own company keyword 126*b* of "automobile" and "parts" is set, and the company C is extracted as the enterprise name 120*a* for which the category 120*b* of the enterprise information 120 is "supplier" and "automobile" and "parts" are set to the business keyword 120*c*.

Then, the similar enterprise-item information generating unit 110 extracts company C's items (for example, "C01") and item keywords (for example, "20 inches", "aluminum", and "virgin material") from the enterprise-by-item keyword information 123 and creates the similar item keyword information 127 (lines 1 to 3 in the example of FIG. 9). Here, when multiple business keywords are set, only enterprise names for which all keywords are set are extracted, but the enterprise name for which only some keywords (for example, only one of "automobile" or "parts") are set may be extracted.

Next, based on the classification name 126*d* and classification code 126*e* of the retrieval target information 126, the similar enterprise-item information generating unit 110 extracts a similar enterprise-item (i.e., an item of an article similar to a target article for which a keyword is to be registered from now, and an enterprise to supply it) from the enterprise-by-item classification code information 122. In the present example, since the classification name "code 2" is set by the classification code "111", D01 of the company D is extracted as the supplier name-item for which the classification name 122*c* of the enterprise-by-item classification code information 122 is "code 2" and the classification code 122*d* is "111". In this case, the similar enterprise-item information generating unit 110 acquires the item keyword set to D01 of the company D from the enterprise-by-item keyword information 123. In the present example, "wheel" and "steel" are extracted as the item keywords set to D01 of the company D, and are added to the similar item keyword information 127 (4th and 5th lines).

Further, the similar enterprise-item information generating unit 110 considers that the enterprise-item for which each extracted keyword is set is also a similar enterprise-item, also extracts F01 of the company F for which "wheel" is set as the item keyword, as a similar enterprise-item, and further adds it to the similar item keyword information 127 inclusive of "free wheel" in addition to "wheel set to F01 of the company F (6th and 7th lines).

In the example of FIG. 4, the classification code "C11" of the classification name "code 3" is set for the item supplied by the company F. This is a classification system different from the classification code "111" of the classification name "code 2" of the retrieval target information 126. Therefore, even if the retrieval is conducted with "code 2" and "111" as retrieval keywords, the item of the company F is not hit. However, as described above, by performing retrieval using the classification code of the retrieval target information 126 as the keyword and further performing retrieval using the item hit in the retrieval as the keyword, even items assigned classification codes of different classification systems can be acquired as similar items.

Although FIG. 9 shows an example of the similar item keyword information 127 generated when the retrieval target information 126 includes both the own company keyword 126*b*, the classification name 126*d*, and the classification code 126*e*, actually, the own company keyword 126*b* may not be input, or the classification name 126*d* and the classification code 126*e* may not be input. When the own company keyword 126*b* is not input, the information in the first to third lines in the example of FIG. 9 is not generated. Further, when the classification name 126*d* and the classification code 126*e* are not input, the information in the fourth to seventh lines in the example of FIG. 9 is not generated.

Then, the related performance information generating unit 111 reads the enterprise-by-item classification code information 122, the access performance information 124, the transaction performance information 125, and the similar item keyword information 127 from the storage unit 12 and generates the similar retrieval result information 128 by linking the related performance information (Step S03). Specifically, the related performance information generating unit 111 performs the following three processing.

First, in the first processing, the related performance information generating unit 111 combines the similar enterprise name 127*c* and similar item name 127*d* of the similar item keyword information 127 and the supplier name 122*a* and item 122*b* of the enterprise-by-item classification code information 122 as keys to obtain the classification name 122*c* and classification code 122*d* for each enterprise-item and create the similar retrieval result information 128 from the similar enterprise name 128*a* to the classification code 128*d*.

For example, three of "company" and "C01", "company D" and "D01", and "company F" and "F01" have been registered in the similar item keyword information 127 of FIG. 9 as a set of the similar enterprise name 127*c* and the similar item name 127*d*. These are registered as the similar enterprise name 128*a* and similar item 128*b* of the similar retrieval result information 128 in FIG. 10. Then, referring to the enterprise-by-item classification code information 122 of FIG. 4, the classification name 122*c* and the classification code 122*d* corresponding to "C01" of "company C" are "code 1" and "123". Similarly, "code 2" and "111" correspond to "D01" of "company D", and "code 3" and "C11" correspond to "F01" of "company F". These are registered as the classification name 128*c* and classification code 128*d* of the similar retrieval result information 128 of FIG. 10.

In the second processing, the related performance information generating unit 111 combines the similar enterprise name 127*c*, similar item name 127*d*, and similar item keyword 127*e* of the similar item keyword information 127, and the supplier name 124*a*, item 124*b*, and item keyword 124*c* of the access performance information 124 as keys to obtain the registration date 124*d* and the number of accesses 124*e* as access performance information for each enterprise-item-keyword and create the similar retrieval result information 128 from the similar enterprise name 128*e* to the number of accesses 128*i*.

Referring to the access performance information 124 of FIG. 6, for example, the keywords of "20 inches", "aluminum material", and "virgin material" are all registered in "Apr. 1, 2020" for "C01" of "company C". The number of accesses for "20 inches" and "aluminum material" is "200", and the number of accesses for "virgin material" is "80". These pieces of information are registered as the similar item keyword 128*g*, registration date 128*h*, and the number of accesses 128*i* corresponding to "C01" of "company C" of the similar retrieval result information 128. Similarly, even for "D01" of "company D" and "F01" of "company F", the information read from the access performance information 124 are registered as the similar item keyword 128*g*, registration date 128*h*, and the number of accesses 128*i*.

In the third processing, the related performance information generating unit 111 combines the similar enterprise name 127*c* and similar item name 127*d* of the similar item keyword information 127, and the supplier name 125*a* and item 125*b* of the transaction performance information 125 as keys to obtain the buyer name 125*c*, the start date 125*d*, the end date 125*e*, and the transaction number 125*f* as the transaction performance information for each enterprise-item and create the similar retrieval result information 128 from the similar enterprise name 128*j* to the number of transactions 128*o*.

Referring to the transaction performance information 125 of FIG. 7, for example, transactions are being conducted with "company M", "company N", and "company P" regarding "C01" of "company C". Transactions with "company M" begins from "Apr. 1, 2021" and are still ongoing, with "300 units" traded to date. Transactions were conducted with "company N from "Jul. 1, 2021" to "Sep. 30, 2021", and "50 units" were traded. Transactions with "company P" begins from "Nov. 1, 2022" and are still ongoing, with "120 units" traded to date. These pieces of information are registered as the buyer name 128*l*, the start date 128*m*, the end date 128*n*, and the number of transactions 128*o* corresponding to "C01" of "company C" in the similar retrieval result information 128. Similarly, even for "D01" of "company D" and "F01" of "company F", the information read from the transaction performance information 125 is registered as the buyer name 128*l*, the start date 128*m*, the end date 128*n*, and the number of transactions 128*o*.

Then, the similar retrieval result display unit 112 reads the secret information 121 and the similar retrieval result information 128 from the storage unit 12, performs concealment processing based on the disclosure/non-disclosure conditions for each item of each enterprise stored in the secret information 121, and passes it to the output unit 15. The output unit 15 transmits the similar retrieval result information 128 to the user terminal 20 via the communication unit 16 (Step S04).

The retrieval result area 302 of FIG. 17 shows an example of a screen which displays similar retrieval results. The retrieval result area 302 includes an enterprise name 302*a*, an item 302*b*, a classification name 302*c*, a classification code 302*d*, a descriptive keyword 302*e*, a registration date 302*f*, the number of accesses 302*g*, a transaction performance 302*h*, a tab 302*i*, a buyer 302*j*, a transaction start date 302*k*, a transaction end date 302*l*, the number of transactions 302*m*, and a buyer filter 302*n*.

The enterprise name 302*a* corresponds to the similar enterprise names 128*a*, 128*e*, and 128*j* of the similar retrieval result information 128 shown in FIG. 10. The item 302*b* corresponds to the similar items 128*b*, 128*f*, and 128*k* of the similar retrieval result information 128. The classification name 302*c* and the classification code 302*d* correspond to the classification name 128*c* and classification code 128*d* of the similar retrieval result information 128. The descriptive keyword 302*e*, the registration date 302*f*, and the number of accesses 302*g* correspond to the similar item keyword 128*g*, registration date 128*h*, and the number of accesses 128*i* in the similar retrieval result information 128. The transaction performance 302*h* displays the number of buyer enterprises which have a transaction performance for the enterprise-item indicated by the enterprise name 302*a* and the item 302*b*.

The buyer 302*j*, the transaction start date 302*k*, the transaction end date 302*l*, and the number of transactions 302*m* correspond to the buyer name 128*l*, the start date 128*m*, the end date 128*n*, and the number of transactions 128*o* in the similar retrieval result information 128.

However, for the buyer 302*j*, the transaction start date 302*k*, the transaction end date 302*l*, and the number of transactions 302*m*, the tab 302*i* to select details of enterprise-by-item transaction performances is provided, and information about the combination of the buyer enterprise and item selected using the tab 302*l* is displayed.

Further, even in the information included in the similar retrieval result information 128, information set as non-disclosure in the secret information 121 is not displayed in the retrieval result area 302.

Specifically, in the present example, when referring to the number of transactions 128*o* from the similar enterprise name 128*j*, C01 of the company C has a performance of transactions with three buyers (companies M, N, and P). When referring to the secret information 121 for these three companies, a transaction performance_enterprise name and a transaction performance_number of transactions in the company N are "not disclosed." Therefore, according to the similar retrieval result information 128, the buyer 302*j* of FIG. 17 is described as "non-disclosure" instead of being described as "company N". Further, according to the similar retrieval result information 128, the number of transactions 302*m* is described as "non-disclosure" instead of being described as "50".

Further, the retrieval result area 302 in FIG. 17 includes a buyer filter 302*n* which filters enterprises with transaction performances, based on the buyer's business keyword. For example, when A01 of company A being a supplier is an automobile part, and the company A desires to conduct a transaction of A01 with a buyer enterprise (for example, an automobile manufacturer or a trading company that sells parts to automobile manufacturers) which handles automobile parts, "automobile" and "parts" may be selected in the buyer filter 302*n*.

In this case, a supplier enterprise that has a performance of transactions with a buyer enterprise for which "automobile" and "parts" are registered as the business keyword 120*c* is identified, and only information on an item keyword set by the identified supplier enterprise is displayed in the retrieval result area 302. Thus, it can be expected that it is possible to recognize an item keyword set by the supplier enterprise already traded with the buyer enterprise that the own company desires to do business therewith, and using this as a reference when setting the own company's item keywords makes it easier for a buyer enterprise that the own company desires to conduct transactions therewith to find the own company's article.

Incidentally, in addition to this, the screen which displays the similar retrieval result information is not limited to the form shown in the retrieval result area 302 of FIG. 17.

Finally, the input unit 14 receives the enterprise information 120, the enterprise-by-item classification code information 122, and the enterprise-by-item keyword information 123 from the user terminal 20 via the communication unit 16 and passes them to the keyword registering unit 113. The keyword registering unit 113 stores those pieces of information in the storage unit 12 (Step S05).

The keyword registration area 303 of FIG. 17 shows an example of a screen which inputs a keyword to describe a target item. The keyword registration area 303 includes a keyword input column 303*a* and a registration button 303*b* which allows registration processing to be executed.

For example, a person in charge of a supplier enterprise refers to the item keywords or the like already set by each supplier enterprise displayed in the retrieval result area 302, determines the item keyword to be set for the own company's target item, and inputs it to the keyword input column 303*a*. In the example of FIG. 17, "20 inches" and "wheel" are input. Thereafter, when the registration button 303*b* is operated, the input keyword is transmitted from the user terminal 20 to the supplier retrieval device 10, and is stored in the storage unit 12.

Incidentally, in addition to this, a screen to input a keyword describing a target item is not limited to the form shown in the keyword registration area 303 of FIG. 17.

After that, the processing section 11 ends the processing of the present flow chart.

According to the present embodiment, for example, when a supplier enterprise tries to set new keywords related to articles provided by the own company, it is possible to retrieve keywords set for the similar enterprise-item and register keywords describing target items with the retrieval results as a reference. This can facilitate matching between the suppliers and the buyers.

Figure 18:
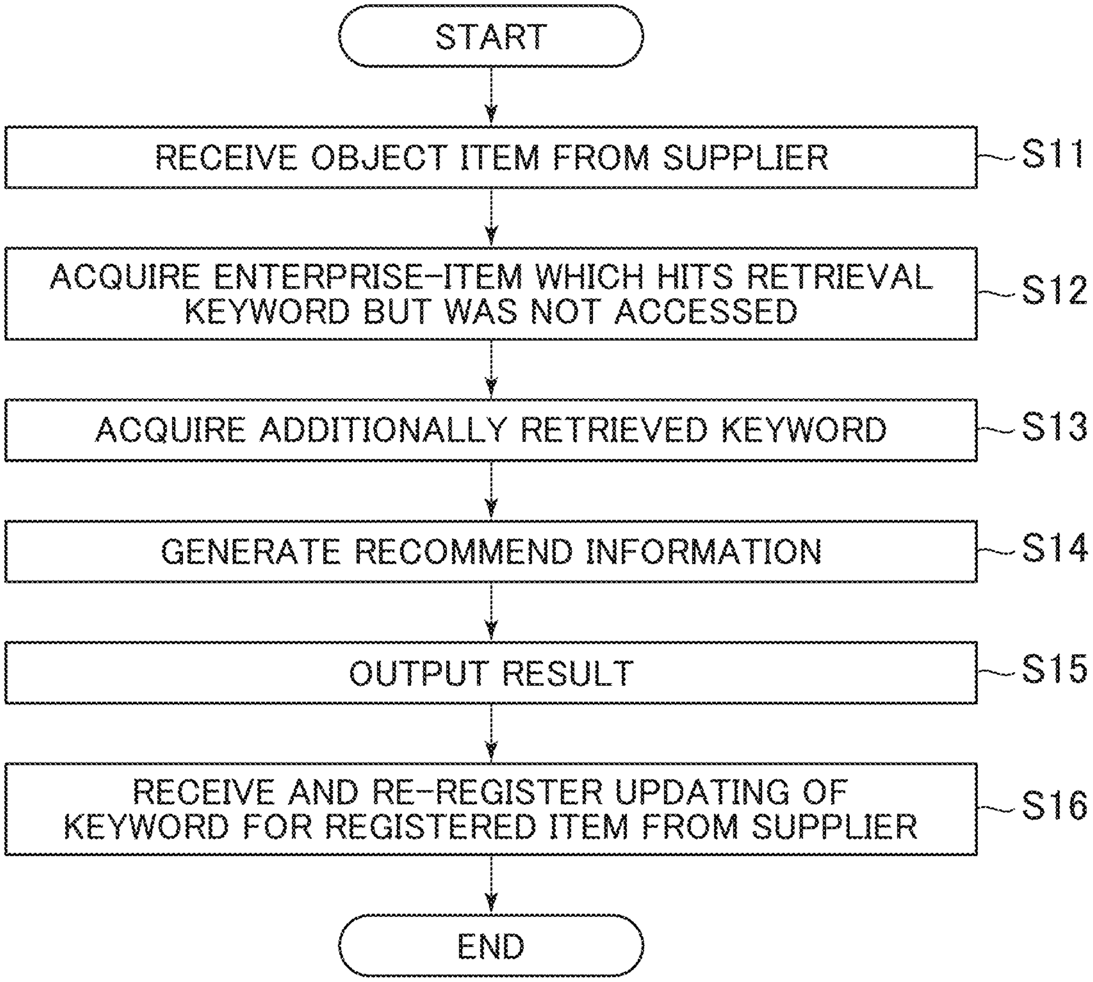
FIG. 18 is a flow chart showing an example of keyword update processing executed by the supplier retrieval device according to the embodiment of the present invention.

FIG. 18 is a flow chart showing an example of keyword update processing executed by the supplier retrieval device 10 according to the embodiment of the present invention.

The present processing is started when the supplier retrieval device 10 is called up from the user terminal 20 of each enterprise at the timing when the supplier confirms each keyword describing the item and updates the same as appropriate.

First, the input unit 14 receives the retrieval target information 126 from an enterprise and stores it in the storage unit 12 (Step S11). A description will be made here about a screen displayed when the processing is executed.

Figure 19:
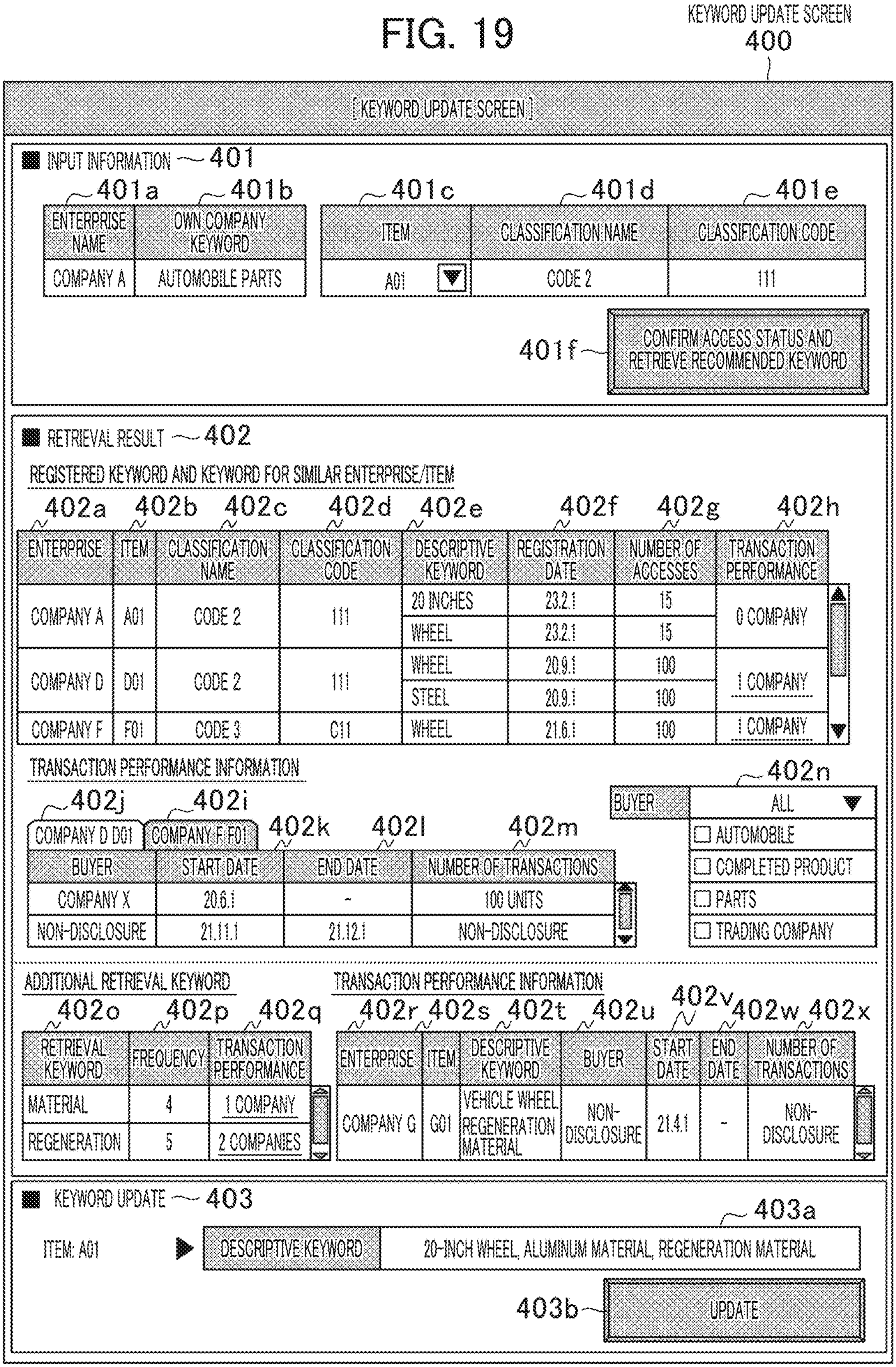
FIG. 19 is a diagram showing an example of a screen displayed when a supplier performs keyword update for an item, in the embodiment of the present invention.

FIG. 19 is a diagram showing an example of a screen displayed when a supplier performs keyword update for an item in the embodiment of the present embodiment.

A keyword update screen 400 is displayed by the output unit 23 of the user terminal 20, for example, when the user terminal 20 of a supplied enterprise which tries to update a keyword calls the supplier retrieval device 10. The keyword update screen 400 includes an input information area 401 which receives the input of the retrieval target information 126 from an enterprise, a retrieval result area 402 which displays retrieval results to be described later, and a keyword update area 403 where the supplier updates the keyword for the item in response to the retrieval results.

In Step S11, the input information area 401 is used. The input information area 401 includes an enterprise name 401*a*, an own company keyword 401*b*, an item 401*c*, a classification name 401*d*, a classification code 401*e*, and a retrieval button 401*f*. The supplier enterprise selects a target item from the item 401*c* and operates the retrieval button 401*f* to generate the retrieval target information 126. In the present example, since the company A is attempting to update an item keyword about an item A01, such retrieval target information 126 as shown in FIG. 8 is generated.

Incidentally, in addition to this, the screen to input the retrieval target information is not limited to the form shown in the input information area 401 of FIG. 19.

Refer again to FIG. 18. The access enterprise-item information generating unit 114 reads the retrieval history information 129 and the access history information 130 from the storage unit 12 to generate the access enterprise-item information 131 (Step S12). Specifically, assumes that for example, as shown in the retrieval history information 129 of FIG. 11, a company N enters a keyword "wheel" at 9 o'clock on Mar. 10, 2023 to conduct supplier retrieval, and the enterprise-item for which the item keyword 123*c* is "wheel", that is, "company A-A01", "company D-D01", and "company F-F01" are hit from the enterprise-by-item keyword information 123 shown in FIG. 5. Then, it is understood from the access history information 130 of FIG. 12 that the company N obtains access to the pages of the company D-D01 and the company F-F01 in the three hit companies, but did not access the page of the company A-A01.

The access enterprise-item information generating unit 114 generates the access enterprise-item information 131 based on its buyer's transition information. Specifically, the access enterprise-item information generating unit 114 stores "company A" and "A01" that were hit in the retrieval but were not accessed in the non-access supplier name 131*a* and the non-access item 131*b*, respectively. Then, the access enterprise-item information generating unit 114 stores "company D" and "D01" being enterprise-items accessed by the buyer in the access supplier name 131*c* and the access item 131*d*, respectively. The same also applies to "company F" and "F01" which are enterprise-items accessed by the buyer.

Next, the additional retrieval keyword information generating unit 115 reads the retrieval history information 129 and the access history information 130 from the storage unit 12 and generates the additional retrieval keyword information 132 (Step S13). This will be described using the previous example.

It can be seen that by referring to the retrieval date and time 129*c* of the retrieval history information 129 and the access date and time 130*d* of the access history information 130, the company N inputs "wheel" to conduct retrieval and accesses the page of the company D-D01, and thereafter further inputs "wheel material" to conduct retrieval. The additional retrieval keyword information generating unit 115 generates the additional retrieval keyword information 132, based on its buyer's transition information.

Here, a method for determining additional retrieval keywords will be described. For example, the additional retrieval keyword information generating unit 115 compares the first and second retrieval keywords and determines a keyword which is present in the second retrieval keyword but not in the first retrieval keyword as an additional keyword. In the present example, the first retrieval is taken for "wheel" and results in hits for company A-A01, company D-D01, and company F-F01, and the second retrieval is taken for "wheel material", so that company A-A01, company D-D01, and company F-F01 are stored in the supplier name 132*a* and item 132*b* of the additional retrieval keyword information 132, respectively, and "material" is stored in the additional retrieval keyword 132*c*. When the combination of the supplier name 132*a*, the item 132*b*, and the additional retrieval keyword 132*c* appears for the first time, the number of retrievals 132*d* is set to "1", and if a record of the same combination already exists, the number of retrievals 132*d* is increased by one.

Next, the recommend information generating unit 116 reads the enterprise information 120, the enterprise-by-item classification code information 122, the enterprise-by-item keyword information 123, the access performance information 124, the transaction performance information 125, the retrieval target information 126, the access enterprise-item information 131, and the additional retrieval keyword information 132 from the storage unit 12 to generate the recommend information 133 (Step S14). Specifically, the recommend information generating unit 116 performs the following four processing.

The first processing is to generate the keyword registered item 133*d* from the additional retrieval keyword 133*a* of the recommend information 133. First, the recommend information generating unit 116 filters records in which the supplier name 132*a* and item 132*b* of the additional retrieval keyword information 132 match the enterprise name 126*a* and item 126*c* of the retrieval target information 126, and stores the additional retrieval keyword 132*c* and the number of retrievals 132*d* in the additional retrieval keyword 133*a* and the number of retrievals 133*b* in the recommend information 133, respectively. Next, the additional retrieval keyword 133*a* stores the supplier name 123*a* and the item 123*b* obtained by filtering the records included in the item keyword of the enterprise-by-item keyword information 123 into the keyword registered supplier name 133*c* and keyword registered item 133*d* of the recommend information 133, respectively.

For example, when "company A" and "A01" are input as retrieval targets as shown in FIG. 8, "material" and "regeneration" are obtained from the additional retrieval keyword information 132 shown in FIG. 14 as the additional retrieval keyword 132*c* corresponding to "company A" and "A01". At this time, the number of retrievals for "material" is "4", and the number of retrievals for "regeneration" is "5". Then, "G01" of "company G" in which the item keyword 123*c* including "material" is registered is obtained from the enterprise-by-item keyword information 123 shown in FIG. 5. Similarly, "G01" of "company G" and "H01" of "company H" in which the item keyword 123*c* including "regeneration" is registered are obtained. These pieces of information are registered from the additional retrieval keyword 133*a* of the recommend information 133 to the keyword registered item 133*d* thereof.

That is, the additional retrieval keyword 133*a* to the keyword registered item 133*d* shown in FIG. 15 show that among the retrievals performed in the past, after the retrieval that "A01" of "company A" was hit, there were four additional retrievals performed by further adding the keyword "material", and in those additional retrievals, "A01" of "company A" was not hit, but "G01" of "company G" is presumed to be hit. Similarly, among the retrievals performed in the past, after the retrieval that "A01" of "company A" was hit, there were five additional retrievals performed by further adding the keyword "regeneration", and in those additional retrievals, "A01" of "company A" was not hit, but "G01" of "company G" and "H01" of "company H" are presumed to be hit.

The second processing is to generate the classification code 133*h* from the supplier name 133*e* of the recommend information 133. First, the recommend information generating unit 116 stores the enterprise name 126*a*, item 126*c*, classification name 126*d*, and classification code 126*e* of the retrieval target information 126 in the supplier name 133*e*, item 133*f*, classification name 133*g*, and classification code 133*h* of the recommend information 133. Next, the recommend information generating unit 116 stores the access supplier name 131*c* and the access item 131*d* obtained by filtering the records that the non-access supplier name 131*a* and the non-access item 131*b* of the access enterprise-item information 131 match the enterprise name 126*a* and item 126*c* of the retrieval target information 126 in the supplier name 133*e* and item 133*f* of the recommend information 133.

Then, the recommend information generating unit 116 acquires the supplier name 133*c* and item 133*d* of the recommend information 133 and stores the result of eliminating duplication of enterprise-item combinations in the supplier name 133*e* and item 133*f* of the recommend information 133. Finally, the recommend information generating unit 116 acquires the classification name 133*g* and the classification code 133*h* corresponding to the supplier name 133*e* and item 133*f* of the stored recommend information 133 from the classification name 122*c* and classification code 122*d* of the enterprise-by-item classification code information 122 and stores them therein.

For example, "company A", "A01", "code2", and "111" included in the retrieval target information 126 shown in FIG. 8 are stored from the supplier name 133*e* to the classification code 133*h*. Further, there is obtained from the access enterprise-item information 131 shown in FIG. 13, information indicating that "A01" of "company A" hit in the keyword retrieval by the buyer is not accessed, while "D01" of "company D" and "F01" of "company F" hit in the same retrieval are accessed. Then, "111" of "code2" corresponding to "D01" of "company D", and "C11" of "code3" corresponding to "F01" of "company F" are acquired from the enterprise-by-item classification code information 122 shown in FIG. 4, and they are stored from the supplier name 133*e* to the classification code 133*h*. Further, "G01" of "company G" and "H01" of "company H" are acquired from the supplier name 133*c* and the item 133*d* shown in FIG. 15, and are stored in the supplier name 133*e* and the item 133*f*.

The third processing is to generate the number of accesses 133*m* from the supplier name 133*i* of the recommend information 133. First, the recommend information generating unit 116 stores the enterprise-item stored in the supplier name 133*e* and item 133*f* of the recommend information 133 in the supplier name 133*i* and item 133*j*. Next, the recommend information generating unit 116 acquires the item keyword 133*k*, registration date 133*l*, and the number of accesses 133*m* corresponding to the supplier name 133*i* and item 133*j* of the stored recommend information 133 from the item keyword 124*c*, registration date 124*d*, and the number of accesses 124*e* in the access performance information 124 and stores the same therein.

For example, "A01" of "company A", "D01" of "company D", "F01" of "company F", "G01" of "company G", and "H01" of "company H" acquired from the supplier name 133*e* and the item 133*f* are stored in the supplier name 133*i* and the item 133*j* shown in FIG. 15. Regarding "A01" of "company A", "20 inches" and "wheel" are acquired from the item keyword 123*c* of the enterprise-by-item keyword information 123 shown in FIG. 5, and are stored in the item keywords 133*k*. Then, it is obtained from the access performance information 124 shown in FIG. 6 that both of the item keywords are registered on "Feb. 1, 2023", and have been accessed 15 times to date. They are stored in the registration date 133*l* and the number of accesses 133*m*. Even for other enterprise-items, an item keyword, a registration date, and the number of accesses are similarly acquired and stored.

The fourth processing is to generate the number of transactions 133*s* from the supplier name 133*n* of the recommend information 133. First, the recommend information generating unit 116 stores the enterprise-item stored in the supplier name 133*e* and item 133*f* of the recommend information 133 in the supplier name 133*n* and the item 133*o*. Next, the recommend information generating unit 116 acquires the transaction partner buyer name 133*p*, the transaction start date 133*q*, the transaction end date 133*r*, and the number of transactions 133*s* corresponding to the supplier name 133*n* and item 133*o* of the stored recommend information 133 from the buyer name 125*c*, start date 125*d*, end date 125*e*, and the number of transactions 125*f* of the transaction performance information 125 and stores the same therein. At this time, when there is no transaction performance information 125 corresponding to the supplier name 133*n* and the item 133*o*, the recommend information generating unit 116 deletes the record.

For example, since the transaction performance information 125 shown in FIG. 7 does not include information about "A01" of "company A", "company A" and "A01" are not stored in the supplier name 133*n* and the item 133*o*. Regarding "D01" of "company D", information indicating that the transaction started on "Sep. 1, 2022" with "company P" being a buyer is still ongoing, and the number of transactions is "20 units" is stored in the transaction partner buyer name 133*p*, the transaction start date 133*q*, the transaction end date 133*r*, and the number of transactions 133*s*. Even for other enterprise-items, similarly, information about the transaction performance is acquired and stored.

Then, the recommend information display unit 117 reads the secret information 121 and the recommend information 133 from the storage unit 12, performs concealment processing based on the disclosure/non-disclosure conditions for each particular of each enterprise stored in the secret information 121 and passes it to the output unit 15. The output unit 15 transmits the recommend information 133 to the user terminal 20 via the communication unit 16 (Step S15).

The retrieval result area 402 of FIG. 19 shows an example of a screen which displays recommend information. The retrieval result area 402 includes an enterprise name 402*a*, an item 402*b*, a classification name 402*c*, a classification code 402*d*, a descriptive keyword 402*e*, a registration date 402*f*, the number of accesses 402*g*, a transaction performance 402*h*, a tab 402*i*, a buyer name 402*j*, a transaction start date 402*k*, a transaction end date 402*l*, the number of transactions 402*m*, a buyer filter 402*n*, an additional retrieval keyword 4020, the number of retrievals 402*p*, a transaction performance 402*q*, and an enterprise 402*r* being transaction performance information for each additional retrieval keyword, an item 402*s*, a descriptive keyword 402*t*, a buyer 402*u*, a transaction start date 402*v*, a transaction end date 402*w*, and the number of transactions 402*x*.

The enterprise name 402*a* corresponds to the supplier names 133*e*, 133*i*, and 133*n* of the recommend information 133 shown in FIG. 15. The item 402*b* corresponds to the items 133*f*, 133*j*, and 133*o* of the recommend information 133. The classification name 402*c* and the classification code 402*d* correspond to the classification name 133*g* and classification code 133*h* of the recommend information 133. The descriptive keyword 402*e*, the registration date 402*f*, and the number of accesses 402*g* correspond to the item keyword 133*k*, registration date 133*l*, and the number of accesses 133*m* of the recommend information 133. The transaction performance 402*h* displays the number of buyer enterprises each having a transaction performance for the enterprise-item indicated by the enterprise name 402*a* and the item 402*b*.

The buyer name 402*j*, the transaction start date 402*k*, the transaction end date 402*l*, and the number of transactions 402*m* correspond to the transaction partner buyer name 133*p*, transaction start date 133*q*, transaction end date 133*r*, and the number of transactions 133*s* of the recommend information 133.

However, for the buyer name 402*j*, the transaction start date 402*k*, the transaction end date 402*l*, and the number of transactions 402*m*, the tab 402*i* to select the details of enterprise-by-item transaction performances is provided, and information about the combination of the buyer enterprise and the item selected using the tab 402*i* is displayed.

The buyer filter 402*n* is provided to filter enterprises with transaction performances, based on buyer business keywords, and is similar to the buyer filter 302*n* shown in FIG. 17.

The additional retrieval keyword 4020 and the number of retrievals 402*p* correspond to the additional retrieval keyword 133*a* and the number of retrievals 133*b* of the recommend information 133. The transaction performance 402*q* indicates the number of supplier enterprises that have actual transaction performances with buyers among the supplier enterprises having registered each additional retrieval keyword, which is calculated based on the keyword registered supplier name 133*c*.

For example, it can be seen that based on the keyword registered supplier name 133*c* and the keyword registered item 133*d*, the supplier for which "material" is registered in the additional retrieval keyword 133*a* is one company "company G", and the item for which the keyword "material" is registered is "G01". Then, it can be seen that based on the supplier name 133*n* and the item 133*o*, the transaction performance related to "G01" of "company G" is obtained, and the transaction is conducted with "company N" based on the transaction partner buyer name 133*p*. Therefore, the transaction performance 402*q* becomes one company. For example, when there is no data for "G01" of "company G" in the supplier name 133*n* and the item 133*o*, the transaction performance 402*q* becomes 0 company.

The enterprise 402*r*, the item 402*s*, the buyer 402*u*, the transaction start date 402*v*, the transaction end date 402*w*, and the number of transactions 402*x* correspond to the supplier name 133*n*, the item 133*o*, the transaction partner buyer name 133*p*, the transaction start date 133*q*, the transaction end date 133*r*, and the number of transactions 133*s*. The descriptive keyword 402*t* corresponds to the enterprise-item item keyword 133*k* indicated by the enterprise 402*r* and the item 402*s*.

Note that even in the case of the information included in the recommend information 133, information set as non-disclosure in the secret information 121 is not displayed in the retrieval result area 402.

Specifically, in the present example, when referring to the number of transactions 133*s* from the supplier name 133*n*, F01 of the company F has a transaction performance with buyers of two companies (company X and company Y). When the secret information 121 for these two companies is referred to, the transaction performance_enterprise name and transaction performance_transaction number of the company X are defined as "non-disclosure". Therefore, the buyer name 402*j* of FIG. 19 is described as "non-disclosure" instead of being described as "company Y" according to the recommend information 133. Also, the number of transactions 402*m* becomes "non-disclosed" instead of being described as "30" according to the recommend information 133. Further, the same processing is performed even from the buyer 402*u* to the number of transactions 402*x*.

Incidentally, in addition to the above, the screen displaying the recommend information is not limited to the form shown in the retrieval result area 402 of FIG. 19.

Finally, the input unit 14 receive the enterprise-by-item keyword information 123 from the user terminal 20 via the communication unit 16 and passes it to the keyword update unit 118. The keyword update unit 118 stores the information in the enterprise-by-item keyword information 123 in the storage unit 12 (Step S16).

The keyword update area 403 of FIG. 19 shows an example of a screen to update each keyword describing the target item. The keyword update area 403 includes a keyword input column 403*a* and an update button 403*b* to execute update processing.

For example, a person in charge of a supplier enterprise refers to the item keywords already set by each supplier enterprise displayed in the retrieval result area 402, and the access performance and transaction performance or the like by the buyer enterprise to the item keywords, and inputs information to update the item keyword set to the own company's target item to the keyword input column 403*a*. In the example of FIG. 19, new keywords "aluminum material" and "regeneration material" are input to the already set "20 inches" and "wheel". This is an example of updating where "A01" of "company A" is a 20-inch vehicle wheel made from the regenerated material of aluminum, but only "20 inches" and "wheel" have been set as keywords.

In this case, referring to the retrieval result area 402, it is possible to find that the descriptive keyword "steel" has a large number of accesses, that there is a performance of retrieval added with keywords such as "material" or "regeneration", and that there is a performance of transactions related to a vehicle wheel for a regenerated material. Based on these pieces of information, it can be determined that adding keywords related to materials will easily lead to more hits in the retrieval and lead even to actual transactions, so that it is possible to conduct the updating of adding "aluminum material" and "regeneration material". After that, when the update button 403*b* is operated, update information of the input keyword is transmitted from the user terminal 20 to the supplier retrieval device 10, and the keyword stored in the storage unit 12 is updated.

Additionally, the screen for updating the keywords descriptive of the target item is not limited to the form shown in the keyword update area 403 of FIG. 19.

After that, the processing section 11 ends the processing of the present flow chart.

According to the present embodiment, it is possible to set keywords that represent differentiation and superiority so that they are made it easy to be hit in buyer retrieval and made easy to access without being buried in other companies' information.

Further, the device configuration of the supplier retrieval system 1 can be changed as appropriate as long as the purpose of the present embodiment is not impaired.

Figure 20:
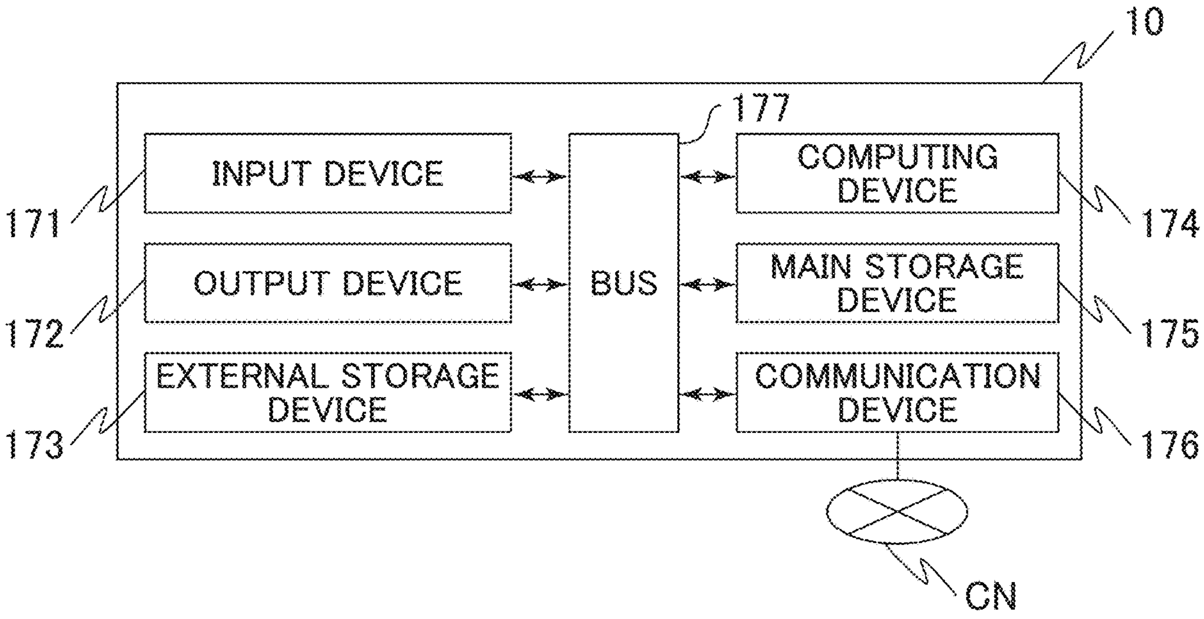
FIG. 20 is a block diagram showing an example of a hardware configuration of the supplier retrieval device according to the embodiment of the present invention.

FIG. 20 is a block diagram showing an example of a hardware configuration of the supplier retrieval device 10 according to the embodiment of the present invention.

The supplier retrieval device 10 includes an input device 171, an output device 172, an external storage device 173, a computing device 174, a main storage device 175, and a communication device 176, and each component is connected by a bus 177. The input device 171 is a device which accepts input operations from a user, and is, for example, a touch panel, a keyboard, a mouse, a microphone, or the like. The output device 172 is a device which performs output processing of data stored in the supplier retrieval device 10, and is, for example, a display device such as an LCD (Liquid Crystal Display), or a printer or the like. Further, the functions of the input device 171 and the output device 172 may be realized by the user terminal 20 on the network CN. The external storage device 173 is a writable and readable storage medium such as an HDD (Hard Disk Drive). The computing device 174 is a central processing unit and executes processing according to a program recorded in the main storage device 175 or the external storage device 173. Each of the processing units constituting the processing section 11 realizes each function by the computing device 174 executing a program. The main storage device 175 is a storage device such as a RAM (Random Access Memory) or a flash memory, and functions as a storage area from which a program or data is temporarily read. The communication device 176 is a device for connecting the supplier retrieval device 10 to the network CN, and is, for example, a communication device such as an NIC (Network Interface Card). The function of the storage unit 12 is realized by the external storage device 173 or the main storage device 175. Note that the processing of each component of the supplier retrieval device 10 may be executed by one piece of hardware, or may be executed by a plurality of pieces of hardware. Further, the processing of each component of the supplier retrieval device 10 may be executed by one program, or may be performed by multiple programs. Since the user terminal 20 of each enterprise also has the same hardware configuration as the supplier retrieval device 10, a description thereof will be omitted.

Further, the system of the embodiment of the embodiment of the present embodiment of the present invention will be configured as follows.

(1) In the retrieval method executed by a retrieval device (for example, the supplier retrieval device 10) having a processing section (for example, the processing section 11) and a storage unit (for example, the storage unit 12), the storage unit holds enterprise information (for example, the enterprise information 120) including a business keyword indicating a business of each enterprise, classification code information (for example, the enterprise-by-item classification code information 122) indicating the classification of each item, and item keyword information (for example, the enterprise-by-item keyword information 123) including the enterprise and an item keyword corresponding to an item of a particle supplied by the enterprise. The retrieval method includes: a first procedure (for example, Step S01) of allowing the processing section to receive at least one (for example, information to be a source of the retrieval target information 126) of a keyword indicative of a business of a first enterprise or a classification code of an item registered by the first enterprise as an input; a second procedure (for example, Step S02 and S03) of allowing the processing section to extract the at least one item keyword (for example, the similar item keyword information 127) corresponding to at least one of an enterprise similar to the first enterprise or an item similar to the item registered by the first enterprise, based on at least one of the keyword indicating the business of the first enterprise or the classification code of the item registered by the first enterprise, by referring to the enterprise information, the classification code information, and the item keyword information, and a third procedure (for example, Step S04) of allowing the processing section to output the extracted at least one item keyword.

Consequently, the keywords set for the similar enterprises and similar items are output, and the setting of keywords which are easy to be retrieved without being buried in other company's information is supported.

(2) In the retrieval method according to (1) described above, the storage unit further holds, for each item of articles supplied by the enterprise, the set item keyword, access performance information (for example, the access performance information 124) indicating a performance of access made to information related to the enterprise and the item after the item keyword has been set, and transaction performance information (for example, the transaction performance information 125) indicating a performance of transactions conducted between the enterprise and a buyer regarding the item, and in the third procedure, the processing section outputs, for each of the one or more extracted item keywords, a performance of access to information on the corresponding enterprise and item (for example, the number of accesses **128*i*), and a performance of transactions regarding the corresponding enterprise and item (for example, the number of transactions 128*o***).

Consequently, the setting of appropriate keywords based on the performance of access from each buyer and the performance of transactions with the buyers is supported.

(3) In the retrieval method according to (2) described above, the enterprise information includes a business keyword (for example, the business keyword **120*c*) indicating a business of an enterprise being the buyer, and when information designating the business of the buyer is input (for example, input to the buyer filter 302*n*** is performed), the processing section outputs the item keyword corresponding to the enterprise and item having a performance of transactions with a buyer related to the designated business among the extracted item keywords in the third procedure.

Consequently, the setting of appropriate keywords based on the relevance to the own company business is supported.

(4) In the retrieval method according to (2) described above, the storage unit further holds secret information (for example, the secret information 121) indicating the particulars of information designated as non-disclosure by each enterprise, among the item keyword information, the enterprise information, the classification code information, the access performance information, and the transaction performance information, and in the third procedure, the processing section performs concealment processing (for example, designation of display of "non-disclosure" indicated in FIG. 17) on the particulars of the information designated as non-disclosure and then outputs the one or more extracted item keywords, the performance of the access, and the performance of the transactions.

Consequently, it is possible to prevent disclosure of information against the wishes of system users.

(5) In the retrieval method according to (1) described above, the storage unit further holds retrieval history information (for example, the retrieval history information 129) including information on a retrieval keyword used in the retrieval for the enterprise and the item performed by the buyer, and access history information (for example, the retrieval history information 129) including a history of access by the buyer to the enterprise and item obtained as a result of the retrieval, and the retrieval method further includes: a fourth procedure (for example, Step S11) of allowing the processing section to receive information designating the first enterprise and the item for which the item keyword has already been set by the first enterprise, as the enterprise and item for which the item keyword is to be updated; a fifth procedure (for example, Step S12) of allowing the processing section to, when, among the plurality of enterprises and items hit by retrieval using the item keyword set for the designated enterprise and item by referring to the access history information, access is not made for the designated enterprise and item, and access is made for at least one other enterprise and item, generate access enterprise item information (for example, the access enterprise-item information 131) including the information of the enterprise and the item for which the access is conducted; a sixth procedure (for example, Step S13) of allowing the processing section to generate additional retrieval keyword information (for example, the additional retrieval keyword information 132) including a retrieval keyword additionally input after retrieval using the item keyword set for the designated enterprise and item is conducted by referring to the retrieval history information; a seventh procedure (for example, Step S14) of allowing the processing section to generate recommend information (for example, the recommend information 133), the recommend information including: the item keyword included in the access enterprise item information and set corresponding to the enterprise and the item having been accessed, the item keyword including the retrieval keyword included in the additional retrieval keyword information, and the enterprise and the item corresponding the item keyword including the retrieval keyword; and an eighth procedure (for example, Step S15) of allowing the processing section to output the recommend information.

Consequently, the setting of keywords which are more likely to be hit in the retrieval by the buyer and are easier to access is supported.

(6) In the retrieval method according to (5) described above, the storage unit further holds, for each item of articles supplied by the enterprise, the item keyword which has been set, access performance information (for example, the access performance information 124) indicating a performance of access made to information related to the enterprise and the item after the item keyword has been set, and transaction performance information (for example, the transaction performance information 125) indicating a performance of transactions conducted to a buyer regarding the enterprise and the item, and in the eighth procedure, the processing section outputs, for the recommend information, a performance of access to information on the corresponding enterprise and item, and a performance of transactions regarding the corresponding enterprise and item.

Consequently, the setting of appropriate keywords based on the performance of access from each buyer and the performance of transactions with the buyers is supported.

(7) In the retrieval method according to (6) described above, the enterprise information includes a business keyword (for example, the business keyword 120*c*) indicating a business of an enterprise being the buyer, and when information designating the business of the buyer is input (for example, input to the buyer filter 302*n* is performed), the processing section outputs the item keyword corresponding to the enterprise and the item having a performance of transactions with a buyer related to the designated business in the eighth procedure.

Consequently, the setting of appropriate keywords based on the relevance to the own company business is supported.

(8) In the retrieval method according to (6) described above, the storage unit further holds secret information (for example, the secret information 121) indicating the particulars of information designated as non-disclosure by each enterprise, among the item keyword information, the enterprise information, the classification code information, the access performance information, and the transaction performance information, and in the eighth procedure, the processing section performs concealment processing on the particulars of the information designated as non-disclosure (for example, designation of display of "non-disclosure" indicated in FIG. 19), and then outputs the recommend information, the performance of the access, and the performance of the transactions.

Consequently, it is possible to prevent disclosure of information against the wishes of system users.

(9) In the retrieval method according to (1) described above, in the second procedure, the processing section extracts an enterprise hit by retrieving the enterprise information using a keyword representing the business of the first enterprise, as an enterprise similar to the first enterprise.

Consequently, the setting of appropriate keywords based on the similarity to the own company business is supported.

(10) In the retrieval method according to (1) described above, in the second procedure, the processing section retrieves the classification code information using the classification code of the item registered by the first enterprise, acquires the at least one item keyword corresponding to the enterprise and item hit by retrieving the classification code information from the item keyword information, and extracts the acquired at least one item keyword as the at least one item keyword corresponding to one or more pairs of an enterprise similar to the first enterprise and an item similar to an item registered by the first enterprise.

This corresponds to, for example, in Step S01, when the classification name "code2" and the classification code "111" are input for "A01" of "company A", in Step S02, referring to the enterprise-by-item classification code information 122, identifying "D01" of "company D" with "code2" and "111" registered, and further referring to the enterprise-by-item keyword information 123, acquiring "wheel" and "steel" corresponding to "D01" of "company D", and adding the same to the similar item keyword information 127.

Consequently, the setting of appropriate keywords based on the similarity to the own company business is supported.

(11) In the retrieval method according to (10) described above, in the second procedure, the processing section retrieves the item keyword information using any of the at least one item keyword corresponding to the enterprise and item hit by retrieving the classification code information, and extracts at least one item keyword other than the item keyword used in the retrieval, corresponding to the enterprise and item hit by retrieving the item keyword information as the at least one item keyword corresponding to one or more pairs of the enterprise similar to the first enterprise and the item similar to the item registered by the first enterprise.

This corresponds to, for example, when "wheel" and "steel" corresponding to "D01" of "company D" are acquired as in the above (11), retrieving the enterprise-by-item keyword information 123 by "wheel", acquiring "wheel" and "free wheel" corresponding to "F01" of "company F", and adding the same to the similar item keyword information 127.

Thus, even when classification codes based on different classification code systems are registered, for example, the setting of appropriate keywords based on similarity to the own company's business is supported.

It should be noted that the present invention is not limited to the embodiments described above, and includes various modification examples. For example, the embodiments described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

Further, each of the above-described configurations, functions, processing units, processing means, etc. may be partially or entirely realized in hardware by designing them in integrated circuits, for example. In addition, each of the above configurations, functions, etc. may be realized in software by a processor interpreting and executing a program realizing each function. Information such as a program, a table, file, etc. which realize each function can be stored in a storage device such as a non-volatile semiconductor memory, a hard disk drive, an SSD (Solid State Drive) or the like, or a computer-readable non-temporary recording medium such as an IC card, an SD card, a DVD or the like.

In addition, the control lines and information lines indicate what is considered to be necessary for description and does not necessarily indicate all control lines and information lines on the product. In practice, it may be considered that almost all configurations are interconnected.

REFERENCE SIGNS LIST

1: supplier retrieval system
10: supplier retrieval device
11: processing section
12: storage unit
14, 22: input unit
15, 23: output unit
16, 21: communication unit
20: user terminal
CN: network

The invention claimed is:

1. A retrieval method executed by a retrieval device having a processing section and a storage unit, the method comprising:

storing, by the storage unit:

enterprise information including a business keyword indicating a business of each enterprise, classification code information indicating the classification of each item, and item keyword information including the enterprise and an item keyword corresponding to an item of a particle supplied by the enterprise, for each article supplied by the enterprise, access performance information indicating a cumulative value of a number of instances that a buyer has retrieved an item using the item keyword from a supplier retrieval service, the access performance information being stored in association with the item keyword and the enterprise supplying the item, and for each item, a number of transactions of the item, as a transaction performance, stored in association with the enterprise supplying the item and respective start dates and end dates for each transaction;

displaying a first guided user interface (GUI) configured to register a first enterprise name, a first business keyword indicative of a business of the first enterprise, a first item, and a first classification code of the first item as inputs;

extracting at least one item keyword corresponding to at least one of an enterprise similar to the first enterprise name or an item similar to the first item registered by the first enterprise, based on the first business keyword, or the first classification code of the first item registered by the first enterprise, by referring to the enterprise information, the classification code information, and the item keyword information;

generating, as an output, an interface and displaying the interface, which includes the extracted at least one item keyword, and for each of the one or more extracted item keywords, the access performance information and the number of transactions regarding the corresponding enterprise and item, and registering via the first GUI, a first item keyword, indicating a keyword of the first item, from among the extracted at least one item keyword; and generating a second GUI which automatically displays additional retravel retrieval keyword information, including additionally retrieved keywords, based on the first business keyword or the first classification code of the first item, and registering an update to the first item keyword via the second GUI by storing one or more additional first item keywords, wherein the storage unit further holds, for each enterprise, information designated as not to be disclosed or to be disclosed thereby indicating whether information among the item keyword information, the enterprise information, the classification code information, the access performance information, and the transaction performance information is to be disclosed to other enterprises, and upon determining information is not to be disclosed, the information is not displayed in the output and, the processing section performs concealment processing on the particulars of the information designated as not to be disclosed and then outputs only the one or more extracted item keywords, the performance of the access, and the performance of the transactions indicated as to be disclosed.

2. The retrieval method according to claim 1, wherein the enterprise information includes a business keyword indicating a business of an enterprise being the buyer, and when information designating the business of the buyer is input, the processing section outputs the item keyword corresponding to the enterprise and item having the number of transactions with a buyer related to the designated business among the extracted item keywords in the third procedure.

3. The retrieval method according to claim 1, wherein the storage unit further holds retrieval history information including information on a retrieval keyword used in the retrieval for the enterprise and the item performed by the buyer, and the retrieval method further comprises:

allowing the processing section to receive information designating the first enterprise and the item for which the item keyword has already been set by the first enterprise, as the enterprise and item for which the item keyword is to be updated;

allowing the processing section to, when, among the plurality of enterprises and items hit by retrieval using the item keyword set for the designated enterprise and item by referring to the access history information, access is not made for the designated enterprise and item, and access is made for at least one other enterprise and item, generate access enterprise item information including the information of the enterprise and the item for which the access is conducted;

allowing the processing section to generate the additional retrieval keyword information including a retrieval keyword additionally input after retrieval using the item keyword set for the designated enterprise and item is conducted by referring to the retrieval history information;

allowing the processing section to generate recommend information, the recommend information including: the item keyword included in the access enterprise item information and set corresponding to the enterprise and the item having been accessed, the item keyword including the retrieval keyword included in the additional retrieval keyword information, and the enterprise and the item corresponding the item keyword including the retrieval keyword; and allowing the processing section to output the recommend information.

4. The retrieval method according to claim 1, wherein the processing section extracts an enterprise hit by retrieving the enterprise information using a keyword representing the business of the first enterprise, as an enterprise similar to the first enterprise.

5. The retrieval method according to claim 1, wherein in the second procedure, the processing section:

retrieves the classification code information using the classification code of the item registered by the first enterprise, acquires the at least one item keyword corresponding to the enterprise and item hit by retrieving the classification code information from the item keyword information, and extracts the acquired at least one item keyword as the at least one item keyword corresponding to one or more pairs of an enterprise similar to the first enterprise and an item similar to an item registered by the first enterprise.

6. The retrieval method according to claim 5, wherein in the second procedure, the processing section:

retrieves the item keyword information using any of the at least one item keyword corresponding to the enterprise and item hit by retrieving the classification code information, and extracts at least one item keyword other than the item keyword used in the retrieval, corresponding to the enterprise and item hit by retrieving the item keyword information as the at least one item keyword corresponding to one or more pairs of the enterprise similar to the first enterprise and the item similar to the item registered by the first enterprise.

7. A retrieval device comprising:

a processing section; and a storage unit storing:

enterprise information including business keywords representing the business of each enterprise, classification code information indicating the classification of each item, and item keyword information including an item keyword corresponding to the enterprise and the item of articles supplied by the enterprise, for each article supplied by the enterprise, access performance information indicating a cumulative value of a number of instances that a buyer has retrieved an item using the item keyword from a supplier retrieval service, the access performance information being stored in association with the item keyword and the enterprise supplying the item, and for each item, a number of transactions of the item, as a transaction performance, stored in association with the enterprise supplying the item and respective start dates and end dates for each transaction, wherein the processing section is programmed to:

displaying a first guided user interface (GUI) configured to register a first enterprise name, a first business keyword indicative of a business of the first enterprise, a first item, a first classification code of the first item as inputs;

extracting at least one item keyword corresponding to at least one of an enterprise similar to the first enterprise name or an item similar to the first item registered by the first enterprise, based on the first business keyword, or the first classification code of the first item registered by the first enterprise, by referring to the enterprise information, the classification code information, and the item keyword information;

generating, as an output, an interface and displaying the interface, which includes the extracted at least one item keyword, and for each of the one or more extracted item keywords, the access performance information and the number of transactions regarding the corresponding enterprise and item, and registering via the first GUI, a first item keyword, indicating a keyword of the first item, from among the extracted at least one item keyword;

generating a second GUI which automatically displays additional retravel retrieval keyword information, including additionally retrieved keywords, based on the first business keyword or the first classification code of the first item, and registering an update to the first item keyword via the second GUI by storing one or more additional first item keywords, wherein the storage unit further holds, for each enterprise, information designated as not to be disclosed or to be disclosed thereby indicating whether information among the item keyword information, the enterprise information, the classification code information, the access performance information, and the transaction performance information is to be disclosed to other enterprises, and upon determining information is not to be disclosed, the information is not displayed in the output and, the processing section performs concealment processing on the particulars of the information designated as not to be disclosed and then outputs only the one or more extracted item keywords, the performance of the access, and the performance of the transactions indicated as to be disclosed.

* * * * *